(12) United States Patent  
Rafii et al.

(10) Patent No.: US 8,836,768 B1  
(45) Date of Patent: Sep. 16, 2014

(54) METHOD AND SYSTEM ENABLING NATURAL USER INTERFACE GESTURES WITH USER WEARABLE GLASSES

(71) Applicants: Abbas Rafii, Palo Alto, CA (US); Tony Zuccarino, Saratoga, CA (US)

(72) Inventors: Abbas Rafii, Palo Alto, CA (US); Tony Zuccarino, Saratoga, CA (US)

(73) Assignee: Aquifi, Inc., Palo Alto, CA (US)

( * ) Notice: Subject to any disclaimer, the term of this patent is extended or adjusted under 35 U.S.C. 154(b) by 0 days.

(21) Appl. No.: 13/975,257

(22) Filed: Aug. 23, 2013

Related U.S. Application Data

(63) Continuation-in-part of application No. 13/757,705, filed on Feb. 1, 2013.

(60) Provisional application No. 61/743,462, filed on Sep. 4, 2012.

(51) Int. Cl.

| | |
|---|---|
| *H04N 13/02* | (2006.01) |
| *H04N 7/18* | (2006.01) |
| *G06T 17/00* | (2006.01) |
| *G09G 5/00* | (2006.01) |
| *G06F 3/01* | (2006.01) |

(52) U.S. Cl.  
CPC .................................. *G06F 3/017* (2013.01)  
USPC .............. 348/47; 348/158; 345/420; 345/633

(58) Field of Classification Search  
CPC ................. H04N 13/0055; H04N 2013/0081; G06T 7/0022; G06T 17/00; G06T 17/10; G06T 17/005; F41G 3/165; G06F 1/1686; G06F 3/011; G06F 3/012; G08B 25/016; G02B 27/017  
USPC ............................ 348/47, 158; 345/420, 633  
See application file for complete search history.

(56) References Cited

U.S. PATENT DOCUMENTS

2013/0335573 A1\* 12/2013 Forutanpour et al. ......... 348/158

\* cited by examiner

*Primary Examiner* — Dave Czekaj  
*Assistant Examiner* — Tsion B Owens  
(74) *Attorney, Agent, or Firm* — Michael A. Kaufman, Esq.

(57) ABSTRACT

User wearable eye glasses include a pair of two-dimensional cameras that optically acquire information for user gestures made with an unadorned user object in an interaction zone responsive to viewing displayed imagery, with which the user can interact. Glasses systems intelligently signal process and map acquired optical information to rapidly ascertain a sparse (x,y,z) set of locations adequate to identify user gestures. The displayed imagery can be created by glasses systems and presented with a virtual on-glasses display, or can be created and/or viewed off-glasses. In some embodiments the user can see local views directly, but augmented with imagery showing internet provided tags identifying and/or providing information as to viewed objects. On-glasses systems can communicate wirelessly with cloud servers and with off-glasses systems that the user can carry in a pocket or purse.

20 Claims, 18 Drawing Sheets

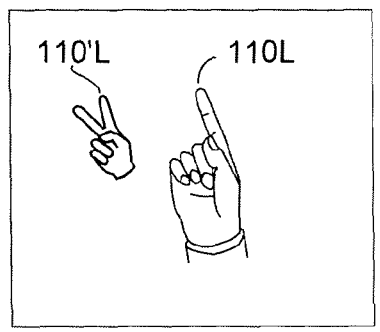
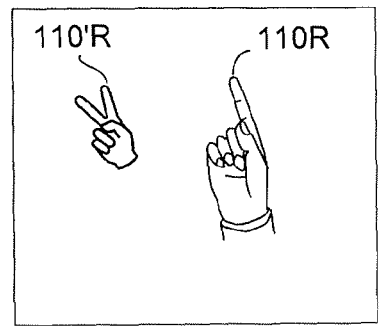
FIG. 6D  FIG. 6E
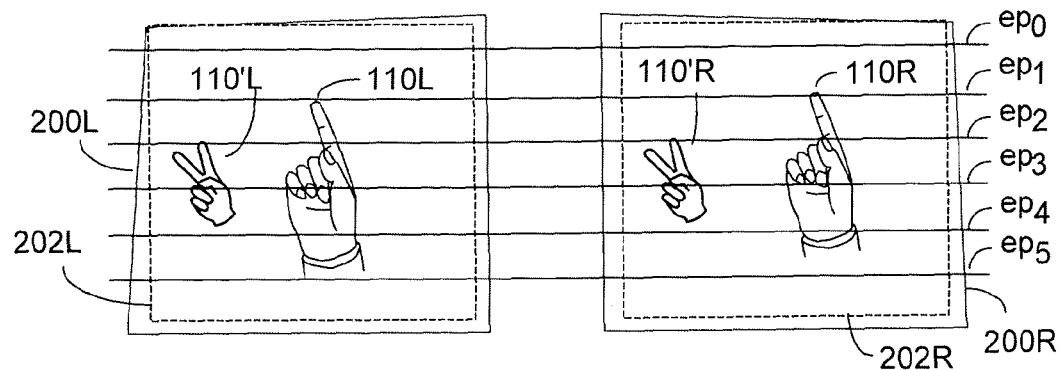
FIG. 6F  FIG. 6G

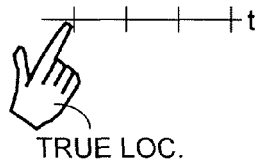
TRUE LOC.
FIG. 7A
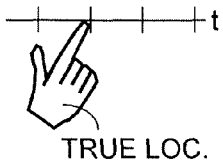
TRUE LOC.
FIG. 7B
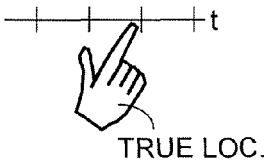
TRUE LOC.
FIG. 7C
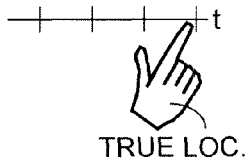
TRUE LOC.
FIG. 7D
FIG. 7E
(PRIOR ART)
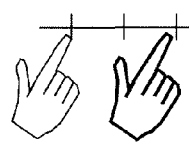
FIG. 7F
(PRIOR ART)
FIG. 7G
(PRIOR ART)
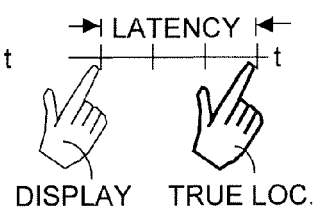
DISPLAY   TRUE LOC.
FIG. 7H
(PRIOR ART)
FIG. 7I
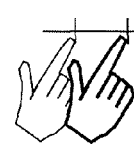
FIG. 7J
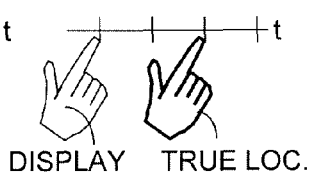
DISPLAY   TRUE LOC.
FIG. 7K

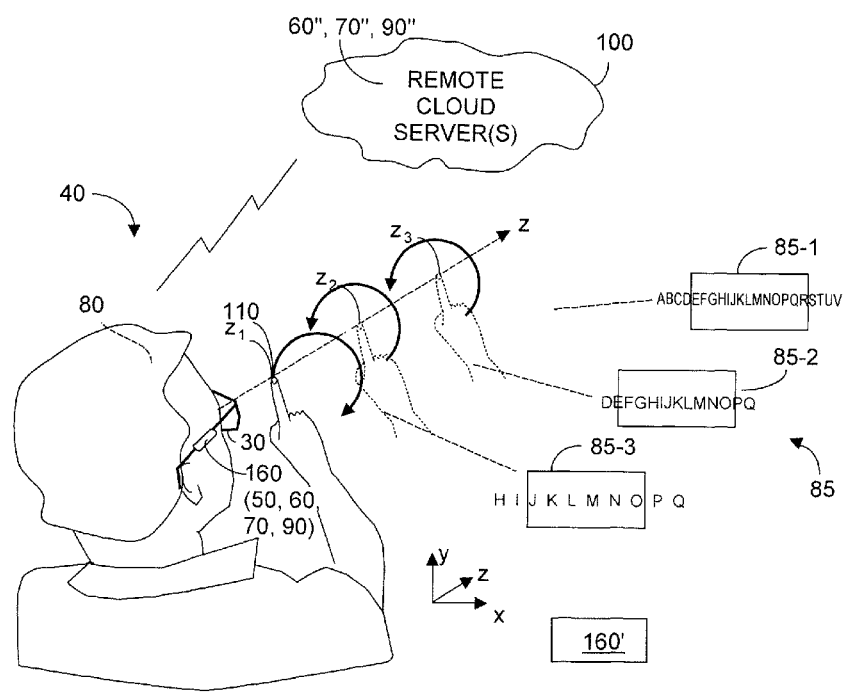
FIG. 11B
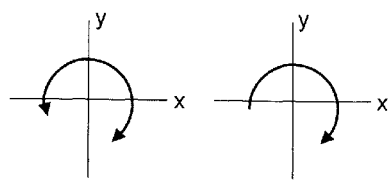 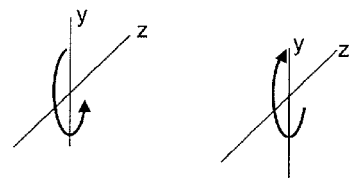
FIG. 11C    FIG. 11D    FIG. 11E    FIG. 11F

METHOD AND SYSTEM ENABLING NATURAL USER INTERFACE GESTURES WITH USER WEARABLE GLASSES

RELATIONSHIP TO CO-PENDING APPLICATIONS

This application is a continuation of applicant's U.S. provisional patent application Ser. No. 61/743,462, filed on 4 Sep. 2012, entitled "3D Natural Interface with Wearable Computer Glasses", and is a continuation-in-part of applicant's U.S. utility patent application Ser. No. 13/757,705 filed on 1 Feb. 2013 entitled "Method and System Enabling Natural User Interface Gestures with an Electronic System".

FIELD OF THE INVENTION

The invention relates generally to methods and systems enabling users to interact using natural gestures with images created and displayed by electronic devices. More specifically the invention relates to such methods and systems that can be implemented on user wearable glasses. Such glasses can have the appearance of normal eyewear and allow the user to see normally through the lenses of the glasses. However natural gesture recognition hardware and software are mounted on or in the frame of the glasses to enable recognition of gestures made by the user's hands and arms within the useable field of view (FOV) of the glasses system. Recognized user gestures can be associated with at least one action, to interact perhaps with an image displayed by the eyewear system and presented to the user on a display attached to the glasses, or perhaps to respond to an image displayed on and created independently of the eyewear system. As such, the invention relates to such user wearable glasses and systems that can also present the user with images with which the user can interact using natural gestures, or that enable the user to interact using natural gestures with externally displayed images.

BACKGROUND OF THE INVENTION

The use of a keyboard, mouse, trackpad, or touch screen to control or to interact with a display equipped device such as a computer, tablet, smart phone, etc. has given way to attempts to enable control and interaction using natural gestures in (x,y,z) space. Gestures are a form of communication made with portions of a user's body, arms, hands, fingers, etc. Such gestures are often called natural interfaces because they can be performed without any additional item, e.g., no stylus, no special gloves, no special marker need be used. Such gestures require little user practice compared to mastering a keyboard or the like, and do not require the user to look away from what might be displayed on or by the device. Further there is less repetitive motion, which can decrease likelihood of repetitive stress injury (RSI) to the user. When such gestures are made within the useable field of view of appropriate devices, the gestures can be interpreted to enable device control or user interaction with device displayed images.

In recent years there has been a migration to smaller and smaller and more portable electronic devices such as netbooks, smart phones, tablets, and such. The use of even smaller and more portable devices such as eye glasses to enable user interaction with displayed images is known in the art. Zhao describes the ornamental design for glasses with a camera in U.S. Pat. D645,493. Zhao's design appears to house the camera and perhaps associated signal processing system electronics in the rather bulky temple or temples of the user wearable glasses. Tang and Fadell describe a "near to eye" display and optics that are mounted on a user-worn visor, helmet, or glasses in U.S. Pat. No. 8,212,859. The '859 patent optically splits a source image to project a left image and a right image, respectively viewable by the user's left and right eyes. A system processor determines left and right image periphery colors that are emitted by respective left and right peripheral light elements. The method is said to enhance the user's viewing experience. Mooring and Fitzgerald disclose in US 2010/0156676 A1 a gesture-based user interface for a wearable portable device, although eyeglasses are not mentioned. A gesture signal is received by sensing movements of the wearable device itself, or perhaps by sensing taps on the wearable device. Clearly, if the wearable device is glasses, performing (x,y,z) gestures would require moving the user's head or tapping the glasses. Such requirements would fatigue the user and would restrict the range of potential gestures that could be made and recognized.

In another prior art approach, Gomez et al. discloses in U.S. Pat. No. 8,179,604 a user wearable marker for interaction with a computing device such as a head mounted display. The user wearable marker may be a ring, bracelet, artificial fingernail, etc. having a particular surface pattern whose reflections of IR energy are uniquely identifiable to the computing device. A pair of camera sensors spaced apart a baseline distance detect such IR reflections for signal processing. Known patterns of marker motion are said to correlate to user hand (and thus marker) movements. If sufficient levels of IR energy are absent, an active source of IR emissions may be required. In Gomez's approach, successfully detecting user-system interaction requires adequate detectable levels of IR energy that reflect off the user worn marker. As such the detected user object in Gomez is adorned in that the user must wear an external device for detection to occur, e.g., a marker such as a ring, a bracelet, an artificial fingernail whose surface-reflected IR patterns are known a priori. Unfortunately in a Gomez system, ambient IR energy can often reflect from the many surfaces of the user's hand and interfere with sensor detection of the desired marker-reflected IR energy pattern. The spaced-apart baseline distance between the sensor pair is known and Gomez uses triangulation to track marker location. The two spatial line of sight angles $(\beta_1, \beta_2)$ are determined, namely the angles between the ray from the center of each camera lens to a respective normal to the camera image plane. Gomez asserts that this information enables determination of marker locations, whose (x,y,z) movements can be matched to pre-determined marker trajectories to recognize gestures, including command gestures. Possibly Gomez estimates angles $\beta_1, \beta_2$ from (x,y) pixel locations on the respective pixel sensor array plane. But absent certain geometric relationships between the two camera sensors, actually determining the (x,y,z) marker location is unsolvable. In addition to requiring the user to be adorned and wear a marker, Gomez lacks the detection accuracy and robustness need to detect three-dimensional user interactions including user pointing gestures.

Prior art systems and methods to detect and recognize gestures, including three-dimensional gestures, can vary from the highly complex and expensive to the relatively straightforward and inexpensive. However implemented, implementing such systems and methods in or on glasses requires components that are light weight, have small form factor, consume little operating power, and preferably are inexpensive. The graphic user interface (GUI) is a favored type of user-device interaction, and refers to user selection of objects presented on a display screen. For example devices such as computers, smart phones, etc. may display a so-called desktop with target items such as icons or buttons or menu options that the user can select, or a spreadsheet with cells that a user may select to enter or modify data, etc. In other applications the GUI might be a map from which the user can select and perhaps zoom in on a particular country or region or city, or the GUI might the trigger of a weapon in a video game display. As used herein, the selection means the act by the use of selecting a selectable GUI object. As used herein, the term detection refers to software code that detects and maps the user object to a predefined coordinate system, and includes identifying displayed user-selectable target items. Determining the user's intent, what the user wants to do with the selected user object, may be considered part of the selection process, or part of the next user action in the sense that user-selection of a displayed menu item may open up a list of sub-menus, or a so-called ribbon. In some applications the user can select an edge or corner of the display whereat no object perhaps is shown to reveal hidden menus that can provide additional user options. The software application controlling the GUI can determine responses to user interactions. For example if the displayed object is a geographic map, user selection of a map location can signal the software and device detection system to execute a grab function. Subsequent user created gestures will result in displayed motion of the map selected point, and map scrolling in the direction of the detected motion. Gestures can also input data to devices, e.g., computers, and thus augment other forms of natural interfaces such as device detection of user speech.

Consider now the various types of gestures that a device must recognize to provide the user with a meaningful natural user gesture experience.

A first type of gesture may be termed a static gesture, and involves detecting certain pre-determined shapes, which are mapped to at least one function on the device. For example if the eye glass device optical detection systems detects the user's open palm with stretched fingers, such gesture may be interpreted as stopping a playlist presented on the virtual or other display.

By contrast, a dynamic gesture may be determined by the motion and trajectory properties of the gesture object, typically the user's hand(s) or finger(s). For example, optical detection system detection of a user's hand being waved left-to-right may be used to scroll a list left or right, or perhaps the user performing a rolling/unrolling gesture may be interpreted to indicate a forward or backward command, perhaps during an internet web browser session.

So-called mouse/touch gestures accommodate software applications intended for use with a graphical user interface (GUI) designed for use with a traditional point and click mouse, electronic pen, or touch gestures in which the user touches the screen displaying the GUI. Understandably mouse use would be rather awkward with wearable eye glasses devices, as would be requiring the user to touch the display to interact with the GUI. But with the present invention, natural gestures may be defined with a user's fingertip, including tracking the fingertip in (x,y,z) space. The detected three-dimensional trajectory can be mapped, e.g., by a processor system on or in the glasses, to provide application updates on imagery viewed on the display screen, thus enabling driving the applications without any physical controller or a special marker. The display screen may be part of a video display system that may be part of the glasses, or may be externally generated and/or displayed.

Consider now the role of z-depth measurements. Accurate detection of how far from the device static and/or dynamic gestures occur may bring significant value to the user, being the distance at which the gesture is performed. For example a gesture made within 12" from the device, or within an approximately 36" arm's length from the device, can augment definitions for the gesture. The advantage could be that the user need not remember too many individual gestures, but instead just a few which can be remembered by most users most of the time, and then using distance as the way to multiply the meaning of those few gestures.

What is needed is an eye glasses mounted system and method enabling recognition of gestures made in (x,y,z) space by a user wearing the glasses within an arm's length of the glasses. Such system and method should not require the user to wear a marker or the like, and should provide detection accuracy and robustness to recognize three-dimensional user gestures that enable a user to interact using a natural user interface. Such interface may be a video image created and presented as a display by the glasses mounted system and method, or may be a video image created and displayed by some other system. In either case, the method and system should be implementable using preferably inexpensive components that are light weight with small form factor, less than perhaps 5 mm in thickness, and consume relatively little electrical operating power, preferably less than 250 mW. Further, such system and method should not require the user's head to be moved (or not moved) to detect and recognize user gestures, and to create appropriate responses thereto. Preferably such method and system provides detection granularity similar to what a conventional mouse can provide. Preferably such method and system can optionally implement multimodal detection, for example detecting user sound(s) to help augment gesture recognition.

The present invention provides eye glasses mounted methods and systems with such features.

SUMMARY OF THE PRESENT INVENTION

The present invention provides a method and system to detect, recognize, and respond to gestures including natural user gestures made by an unadorned user object, which method and system are implemented in or on eye glasses. The glasses are worn by the user whose unadorned hand(s), finger (s) (user object(s)), make the gestures within an arm's length of the glasses, without requiring any sort of Gomez-type marker to be worn by the user, whose marker IR reflection patterns need be known a priori to the eye glasses system. As such the present invention functions with an unadorned user object (and of course could also function with an adorned user-object, i.e., a user-object wearing a marker). The user can look through the glasses normally and view whatever is to be seen in the eyes' normal field of view. Alternatively the user can view imagery on a display mounted to the eye glasses. Depending upon display mounting, the user can thus look up or down or sideways to view a display with one eye, which display can show computer type imagery to which the user can respond by natural hand gestures. The imagery may include GUIs created by and presented on a display attached to the glasses, imagery obtained from at least one camera aligned with the user's line of sight, or with imagery presented on an external display on an off glasses device such as a smart TV, a netbook. The viewed imagery can be dynamically altered in response to the user's gestures, as acquired, detected, and processed by systems associated with the glasses. More specifically the glasses include an optical acquisition system whose inclusive field of view (FOV) defines a three-dimensional (x,y,z) hover zone extending outwardly from the glasses for at least an arm length. Acquisition of user made hand gestures occurs within a dynamically resizable and customizable three-dimensional interaction subzone defined within the hover zone. Thus, using the (x,y,z) position of user-object within the interaction subzone, gestures are recognized and responded to accordingly. Different modes of user gestures can be recognized including modes to initiate or terminate a gesture session.

The optical imaging acquisition system preferably includes a pair of spaced-apart two-dimension cameras whose overlapping FOVs define the (x,y,z) hover zone. Other alternatives to acquiring optical images are less desirable for reasons that include costs, form factor, operating power requirements, and complexity. Such less desirable or less practical alternatives include using an optical imaging acquisition system having a time-of-flight (TOF) camera system, a structured light camera system, or a single two-dimensional camera. The glasses system preferably includes a signal processing system that intelligently discerns user made gestures from two-dimensional (x,y) information provided by the optical acquisition system. This information is intelligently processed to search for and rapidly identify a relatively few so-called landmark (x,y,z) points on the user object(s) that suffice to recognize and identify user gestures. The signal processor system preferably includes a processor and memory storing algorithm(s) that are executed by the processor to recognize and identify user gestures in the acquired optical information. Processor memory stores information useful to matching potential acquired gestures. The signal processor system intelligently discards typically at least 99% of the incoming data, while extracting a sparse set of relatively few so-called (x,y,z) landmark points of the imaged user object sufficient to identify gesture(s). Thus only a relatively tiny fraction of all potential acquired image data need be processed. Signal processing includes comparing landmark (x,y,z) information including landmark position and velocity with stored data to identify the user gestures and the context in which they were made. The signal processing system converts sparse sets of three-dimensional (x,y,z) landmark gesture coordinates to real world $(x_w, y_w, z_w)$ coordinates that may be referenced to the on-glasses cameras. Additional signal processing preferably includes edge detection, optional skin color modeling, machine learning, pinhole camera modeling, epipolar geometry, image rectification and three-dimensional reconstruction. The signal processing occurs substantially in real time using on demand, using low power consuming, inexpensive processors. Gestures can be captured in a raw format that best describes location and motion of perceived user objects. Further, flexibility is provided in determining at what processing state a raw data capture should be interpreted as a high level command. High level commands and raw representations can be described as a series of event names, event identification, and optionally can be associated with three-dimensional locations, and angle and velocity information. In some embodiments signal processing may occur off-glasses, using an external signal processor wirelessly coupled to the glasses system.

The glasses system also includes an input/output (I/O) system and preferably a video generation system that presents video imagery on a virtual display viewable by the user wearing the glasses. The I/O system can wirelessly communicate with other systems including external devices and/or cloud-located remote servers. Video updates to the user viewable display are made commensurate with detected and recognized user gesture(s). Alternatively video imagery updates can be wirelessly communicated by the I/O system to external devices such as a smart TV, a netbook, whose video will be updated commensurate with the user response(s), to be viewed by the user wearing the glasses. Thus, the user, without having to look away, can interact with video imagery in a most natural fashion, by using one or both hands. If the video imagery is a game, the user can view and play the game using gestures that the glasses system will detect and respond to. The video images may present icons and/or menu options that the user can select and interact with using gestures. The imagery may complement the normal view the user sees through the glasses, for example perhaps GPS augmented labels to identify viewed objects, or generated labels identifying buildings viewed by the user, or merchandise sales within those buildings, etc. Embodiments include a retrofitable glasses system that can simply clip-on to a user's existing eye glasses, in the manner of clip-on sun glasses.

Other features and advantages of the invention will appear from the following description in which the preferred embodiments have been set forth in detail, in conjunction with their accompanying drawings.

BRIEF DESCRIPTION OF THE DRAWINGS

FIG. 6B-FIG. 6G depict use of epipolar-line camera system geometric properties to disambiguate multiple corresponding potential landmark candidates acquired by an acquisition system such as depicted in FIG. 2A and FIG. 2B, according to embodiments of the present invention;

FIG. 7A-FIG. 7K depict latency improvements provided by embodiments of the present invention;

FIG. 11B-FIG. 11F depicts exemplary imagery granularity rate scaling made with rotational gestures, according to embodiments of the present invention.

DETAILED DESCRIPTION OF THE PREFERRED EMBODIMENTS

As mobile communication and computer devices proliferate, a new class of mobile devices is gaining popularity, namely devices that a user can wear as regular eye glasses (glasses). Preferably relevant computing, communication and display components are built-in to the glasses-mounted device in a preferably light weight stylish package. Device wearable glasses, if provided with adequate computing resources (on or off the eye glasses), can deliver the benefits of running applications as do other mobile devices. If the user normally wears corrective eye glasses, then lenses in the glasses device would be per the user's corrective lens prescription. Otherwise lenses in the glasses would be neutral, e.g., non-correcting.

Figure 1:
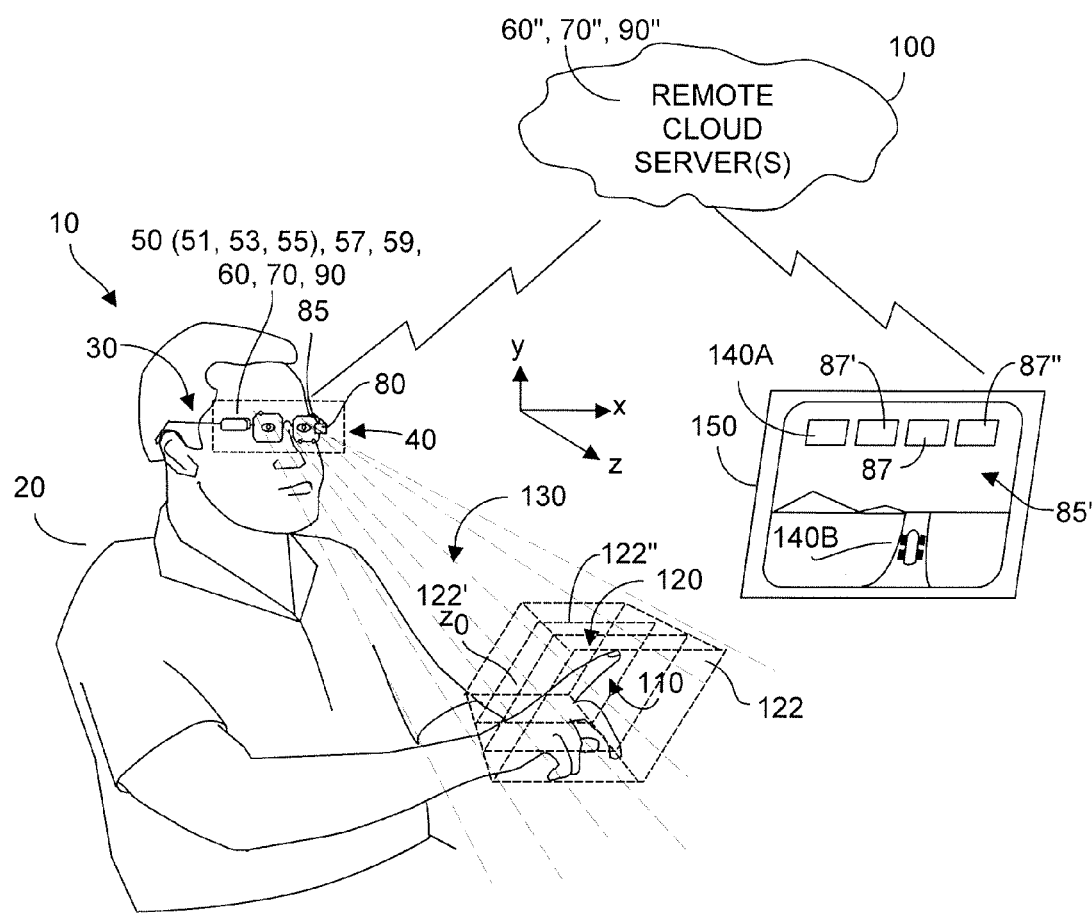
FIG. 1 depicts an overall eye glasses wearable system with a generic optical acquisition system worn by a user to capture and recognize gestures made by the user responsive to video imagery presented by the system and/or presented by an external display device, according to embodiments of the present invention.

FIG. 1 depicts an exemplary system 10 according to embodiments of the present invention. A user 20 wears eye glasses device 30 that implements a glasses system 40. Device system 40 includes an optical acquisition system 50, which may be implemented as a time-of-flight (TOF) system 51, a structured light system 52, or preferably a system 53 comprising at least one two-dimensional camera. As described herein, optical acquisition system acquires optical information of what the user sees, including gestures made with the user's hand(s). Glasses system 40 may include an active light source 57 to augment inadequate ambient light for system 50, and a microphone 59 to detect user made sounds intended to convey intent to system 40, e.g., "stop", "select". Optionally software associated with system 40 (see FIG. 5) can process such audio clues to augment recognition of optically acquired user gestures. System 40 further includes a signal processing system 60, and preferably a video generation system 70 that presents on display 80 user viewable imagery 85. Virtual display 80 is attached (or attachable) to glasses 30 and by looking downward or upward, or perhaps slightly to the side, the user's left eye (in the drawings) can see imagery 85 on virtual display 80. The user's right eye sees whatever imagery normally is to be seen within eyesight in the surrounding real world. Of course in practice, the user's two eyes cannot simultaneously focus on the imagery presented on the virtual display and also on the real world imagery; one eye will focus, and then the other eye will focus. Device system 40 further includes an input/output (I/O) system 90 that can communicate with systems 50, 60, 70, 80, and can communicate wirelessly (indicated by zig-zag lines) with nearby electronic devices (perhaps a smart phone) and/or via a cloud of remote servers 100 with other systems preferably including through Bluetooth or Internet communication. Servers 100 preferably include a signal processing system 60" similar to but preferably more powerful than in-glasses signal processing system 60, a video generation system 70" similar to but preferably more powerful than in-glasses video generation system 70, and an I/O system 90" similar to but preferably more powerful than in-glasses I/O system 90.

In practice the user can view imagery 85 on display 80 and react to the imagery. Without limitation such imagery may include real-time imagery (if any) produced by on-board optical acquisition system 50, a GUI presentation perhaps with icons such as on a computer desktop screen, and/or video, and/or a superimposition of real-time imagery and computer generated GUI presentation. Typically the user can interact with the viewed imagery by making gestures with the user's hand(s). Glasses system 40 detects these gestures, which may include natural user gestures made with unadorned (i.e., markerless) hand or hands 110 of user 20, which gestures are made in (x,y,z) space within a detection zone 120 that is a sub-region of a three-dimensional hover zone 130 that is defined by optical acquisition system 50. In practice useable z-depth of hover zone 130 will be perhaps one meter, e.g., average arm's length for a user. The term "user object" may be used herein to refer to the user's hand(s) or finger(s) with which gestures are made. Further as used herein with respect to embodiments of the present invention, the term "user object" is understood to mean an unadorned user object. Thus, the user object is not required to be adorned with a marker such as Gomez requires: a user wearable bracelet, a ring, a decal, etc., whose reflection patterns to IR energy are known a priori for purposes of object recognition. This is of course completely inapposite to Gomez-type sensing in which an adorned user object is mandatory, a user object that does include a marker or the like, whose reflections to IR energy must be known a priori before useful object recognition can occur. While the present invention could of course recognize an adorned user object, Gomez-type systems cannot recognize an unadorned user object.

In FIG. 1 and other figures herein, for ease of illustration sub-region detection zone 120 is depicted as a having a three-dimensional shape that may converge in volume facing glasses device 30, e.g., as dimension z becomes smaller. However interaction sub-region detection zone 120 could instead be defined with some other shape, perhaps a cubic shape, a rectangular box shape, etc. Thus the shapes for sub-region detection zone 120 depicted in the figures are understood to be exemplary. Interaction sub-region zone 120, which may be defined as a plurality of at least three parallel planes, within larger three-dimensional hover zone 130. As used herein, let 122 denote a front such plane closest to the user object 110, let 122' denote a roughly middle such plane that is also denoted as the $z_0$ plane, and let 122" denote a rear plane closest to glasses system 30. Overall system 40 detects and quickly recognizes user gestures made within interaction sub-zone 120, and causes the system to respond by issuing appropriate commands that typically alter imagery 85 viewed by the user, either on display 80 or on an external device such as display 150 in FIG. 1.

As noted, such gestures typically are made by the user responsive to imagery viewed on virtual display 80. However in some embodiments the user may interact with imagery, perhaps menu icons 140A such as user selectable menu buttons including button 87, or a gesture-steerable virtual speed car 140B on a raceway, presented on an external display device 150, e.g., a smart TV, a netbook or tablet display, etc. Whether displayed on the glasses or externally, the video may include static and/or dynamic components. It is noted from FIG. 1 that unlike some prior art systems, user 20 is not required to wear any sort of marker to assist in the gesture recognition process. Signal processing to intelligently identify user gestures occurs substantially in real time, which means as fast as is practicable, typically within about one second or less.

Whether imagery such as exemplary 140A, 140B is viewed on display 80 or on an external display 150, user 20 can manipulate hands and fingers 110 within detection zone 120 to communicate using natural gestures in response to the imagery. In some embodiments images 85 presented on an external display 150 can be created within glass system 40 and transmitted wirelessly, e.g., via server 100, to the external display. Such images 85 may in fact be captured by one of at least two-dimensional cameras 55 mounted on or in glasses device 30. Other embodiments use at least two-dimensional cameras 55 to capture user gestures made within sub-region zone 120, and transmit appropriate commands wirelessly, e.g., via server 100, to cause visual interaction with displayable imagery 85 created independently of glasses device 30. In such latter embodiments, the user might interact using gestures with video game imagery 85 presented by external display 150, which gestures are recognized by glasses system 40. Perhaps the video game is a tennis match, and the user can "return" the virtual tennis ball presented as part of imagery 85 on display 150 using a hand motion gesture, detected and interpreted by glasses system 40. The glasses system would then transmit wirelessly, perhaps via server 100, appropriate commands to display monitor 150 to cause the virtual tennis ball to be "returned" responsive to the user gesture. In another application, perhaps the user gesture moves a cursor or selects an icon presented as part of imagery 85 on display 150. Many, many applications for the present invention are possible.

Detection of user object 110 by optical acquisition system 50 occurs within interaction sub-region zone 120, which may be defined as a plurality of at least three parallel planes, within larger three-dimensional hover zone 130. As used herein, let 122 denote a front such plane closest to the user object 110, let 122' denote a roughly middle such plane that is also denoted as the $z_0$ plane, and let 122" denote a rear plane closest to glasses system 30. System 60 then processes optically captured gesture information to identify user gestures data therein and to create appropriate command(s) or other instructions commensurate with the perceived user intent. I/O system 90 communicates the user intent as relevant commands and instructions to cause alteration of the imagery presented by system 70 on virtual display 80, or presented on external device 150. If the user gestures to select an icon 140A, system 40 can cause the imagery to alter or state of the display to change (e.g., turn on, turn off, etc.), commensurate with the user selection. For example in FIG. 1, if with gestures user perhaps "steers" virtual car 140B to the left or right, system 40 can cause the displayed imagery to reflect this user control. In general, gestures can be captured in a raw format that best describes the location and motion of the user object, and flexibility exists in determining at what processing state a raw data capture should be interpreted as a high level command. High level commands and raw representations can be described as a series of event names, event identification, and optionally can be associated with three-dimensional locations, and angle and velocity information of the user object.

In FIG. 1 optical acquisition system 50 was referred to only generally. It is useful to now consider various potential implementations to detect three-dimensional gestures in system 50 before describing embodiments of the present invention in greater detail.

As noted, some devices 10 include an optical acquisition system 50 comprising a TOF system 51. TOF systems are known in the art, and are described in numerous U.S. patents awarded to Canesta, Inc., formerly of Sunnyvale, Calif. Such TOF systems emit active optical energy and determine distance (x,y,z) to a target object, e.g., user 110 by counting how long it takes for reflected-back emitted optical energy to be sensed, or by examining phase shift in the reflected-back emitted optical energy. Optical energy coming into the TOF system falls upon a sensor array of pixels, in which each pixel produces a depth (z) signal and a brightness signal for the imaged scene. Although VGA or QVGA class pixel array density is relatively low, the pixel array silicon area will be rather large because typically TOF pixels are much larger than typical RGB camera pixels. TOF systems acquire true three-dimensional data without needing to triangulate to detect an (x,y,z) location of a target object.

In practice, many factors militate against device 10 having an optical acquisition system 50 that includes a TOF system 51. According to the present invention, adequately recognizing a user's finger to recognize a gesture in an (x,y,z) hover zone requires identifying as few as perhaps ten points. But a TOF system cannot simply provide three-dimensional data for ten points. Instead the TOF system must image the entire user target, which unfortunately generates a huge amount of intermediate raw data, to literally produce a cloud of three-dimensional data points. For example, a TOF system with a VGA-class sensor array acquires data from (640·480) or 307,200 (x,y) pixel array locations to produce a cloud of perhaps 100,000 or more (x,y,z) data points. Such immense data requires significant processing, even though perhaps only ten three-dimensional gesture data points need be used by the software application executed by the glasses system to recognize and identify user made gestures.

Many factors also militate against embodiments of device 10 having an optical acquisition system 50 that includes a prior art structured light system 53. Such system requires an optical diffuser used in illuminating the target object with a projected light pattern, and seeks to identify the target object from distortions in the light pattern resulting from surface curvature of the target object surface. The system typically requires substantial operating power, and produces a dense cloud of (x,y,z) data points, requiring significant processing, even though perhaps as few as ten three-dimensional gesture data points may be used for the recognition software application.

In some embodiments device 10 could include an acquisition system 50 having a single two-dimensional camera to acquire user images made within the FOV of the camera. Such devices 10 would be relatively inexpensive and have small form factor, and could recognize simple gestures made in a two-dimensional (x,y) plane. But absent reliable depth z-measurements, recognition of many gestures using a single two-dimensional camera would be constrained. Further error in identifying gestures would occur due to susceptibility to artifacts in the imaged background. User experience with such an acquisition system would be disappointing due to the high probability of misidentified gestures.

In view of the above comments, it will be appreciated why embodiments of the present invention include an optical acquisition system preferably comprising at least two two-dimensional cameras. Such systems can be implemented using two cameras that in quantity cost about $3, have a power consumption of perhaps 300 mW or lower, and occupy a volume on the order of less than 1 cm$^3$. Other advantages of such an optical acquisition system include about 1 mm accuracy at 0.3 M distance, the ability to perform well in ambient light, and implementation that does not require customized ICs. Thus while device 10 in FIG. 1 may include an acquisition system 50 using a TOF camera system, or a structured light system, or a single two-dimensional camera, such systems are less desirable than optical acquisition using at least two two-dimensional cameras. Accordingly the descriptions that follow will therefore be directed to embodiments of the present invention in which two two-dimensional cameras are used in implementing optical acquisition system 50.

Figure 2A:
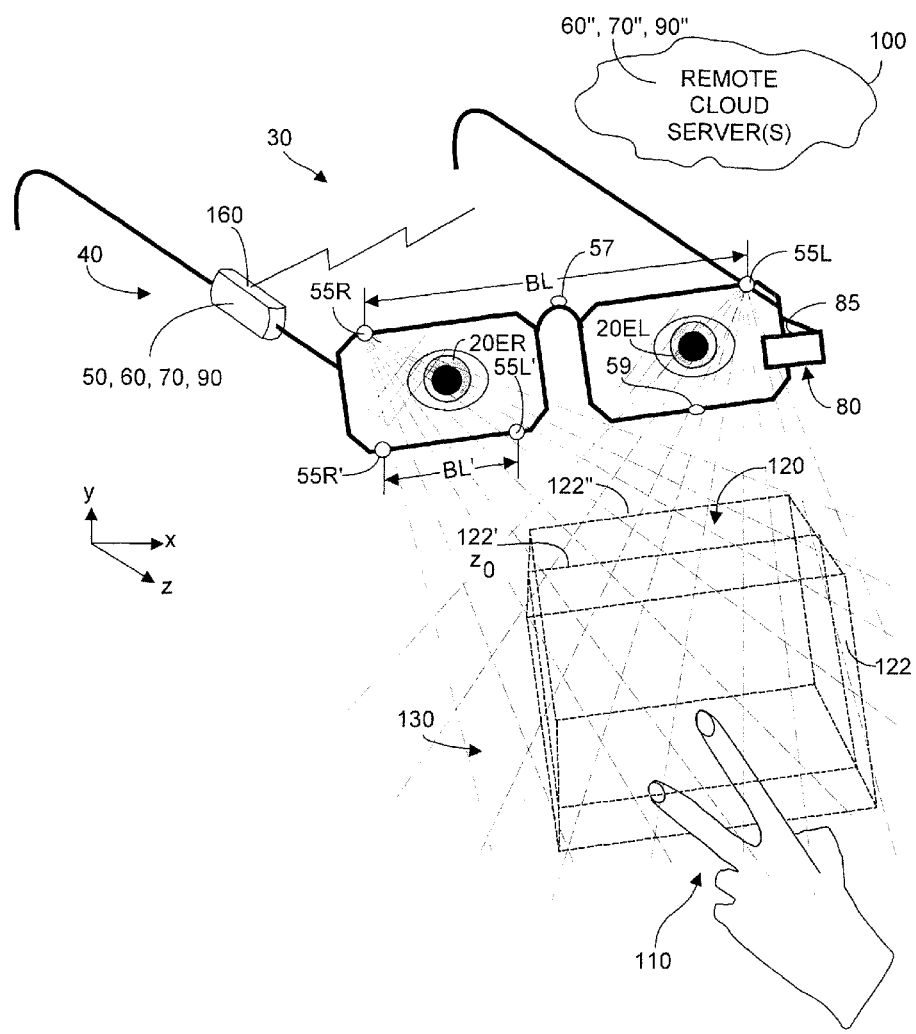
FIG. 2A is a perspective view of a system mounted on or in eye glasses, with an optical acquisition system that includes a pair of spaced-apart two-dimensional usable to recognize gestures, and showing a plane of interaction region within a larger hover zone, according to embodiments of the present invention.

Referring now to FIG. 2A, glasses device 30 is shown as including an optical acquisition system 50 comprising a pair of two dimensional cameras 55L, 55R shown disposed on the top frame portion of the glasses spaced-apart a distance BL, or alternatively two two-dimensional cameras 55L', 55R' disposed on a lower frame region of glasses 30 spaced-apart a shorter distance BL'. (Other mounting locations on glasses 30 for a spaced-apart pair of two-dimensional cameras are of course possible.) Optionally device 10 may include an active light source 57, for use in the event there is insufficient ambient illumination to acquire optical images suitable for reliable gesture acquisition and processing. System 50 may optionally include a microphone 59 to detect user utterances, perhaps made in synchrony with or in lieu of gestures, e.g., "slower", "faster", etc. Acquired acoustic information may be signal processed by signal processing system 60, which also processes optically acquired gesture information. Shown mounted on the right temple of glasses 30 is a housing 160 wherein components comprising glasses system 40, i.e., optical acquisition system 50, signal processing system 60, video generation system 70, and I/O system 90 may be disposed including a battery power supply to power these systems. Although mounted externally from housing 160 it is understood that cameras 55L, 55R, or 55L', 55R' are part of optical acquisition system 50.

For ease of illustration, FIG. 2A depicts the user's hand 110 and the user's right and left eyes, respectively 20ER, 20EL. As depicted the user's right eye 20ER looks through the right lens of glasses 30 and see whatever would normally be seen. However the user's left eye may look through the left lens of glasses 30 and views virtual imagery 85 that the user can see on virtual display 80. It is the user's gesture responses to such imagery that glasses system 40 responds to, as described later herein. FIG. 2A does not depict electrical traces coupling systems within housing 150 to cameras 55L, 55R, or 55L', 55R', to optional active light source 57, to optional microphone 59, or to virtual display 80. In a commercial embodiment such traces could be molded within the frame of glasses 30. Three exemplary parallel planes 122, 122' (or z0) and 122" are depicted in FIG. 2A within interaction sub-region zone 120, which lies within the larger three-dimensional hover zone 130.

As shown in FIG. 2A, a pair of two-dimensional cameras is spaced-apart by a baseline distance BL or BL'. This baseline distance affects z-depth resolution calculations that are important to accurately track motion of user gestures, and to substantially eliminate false or untended gestures. It is understood that the z-axis extends outwardly from the glasses towards the user object, e.g., a hand, as shown in FIG. 1 and FIG. 2A. Embodiments of the present invention seek to enhance user experience when making gestures, and to provide a granularity of gesture resolution that is commensurate with what a user might experience as if using a computer mouse to select, essentially providing a virtual equivalent to mouse clicking, or otherwise manipulate imagery on a computer display rather than using hand gestures. Table 1 compares z-depth resolution for different camera baseline distances, taking into account camera lens field of view, camera sensor pixel array (column/row) resolution, and algorithm factors such as sub-pixel calculation. In practice a z-depth resolution of <5 mm is desired for reliable system 40 functioning and for good user experience. With reference to FIG. 2A, camera pair 55R, 55L can achieve BL≥60 mm, whereas camera pair 55R', 55L' can achieve BL'≈20 mm, while retaining better than 5 mm z-axis resolution using high definition two-dimensional cameras with acceptable depth accuracy. As shown by Table 1, even BL'=20 mm can achieve z-resolution <5 mm at a distance of about 0.55 M, about half an arm's length from the glasses, assuming a VGA class camera sensor is used. A BL=60 mm for camera pair 55R, 55L in practice can resolve <5 mm out to a full arm's length or so, about 1 M. Understandably it is neither necessary nor desirable to process optical image information obtained farther away from the glasses than even a long armed user can reach. To process such information would be a waste of computing resources since the data in question would be too far from the user to represent a gesture made with the user's hand(s).

TABLE 1

| z-depth distance (mm) | 60 mm baseline | 20 mm baseline |
| --- | --- | --- |
| 100 | 0.1 | 0.2 |
| 150 | 0.1 | 0.4 |
| 200 | 0.2 | 0.7 |
| 250 | 0.4 | 1.0 |
| 300 | 0.5 | 1.5 |
| 350 | 0.7 | 2.0 |
| 400 | 0.9 | 2.6 |
| 450 | 1.1 | 3.3 |
| 500 | 1.4 | 4.1 |
| 550 | 1.7 | 5.0 |

Figure 2B:
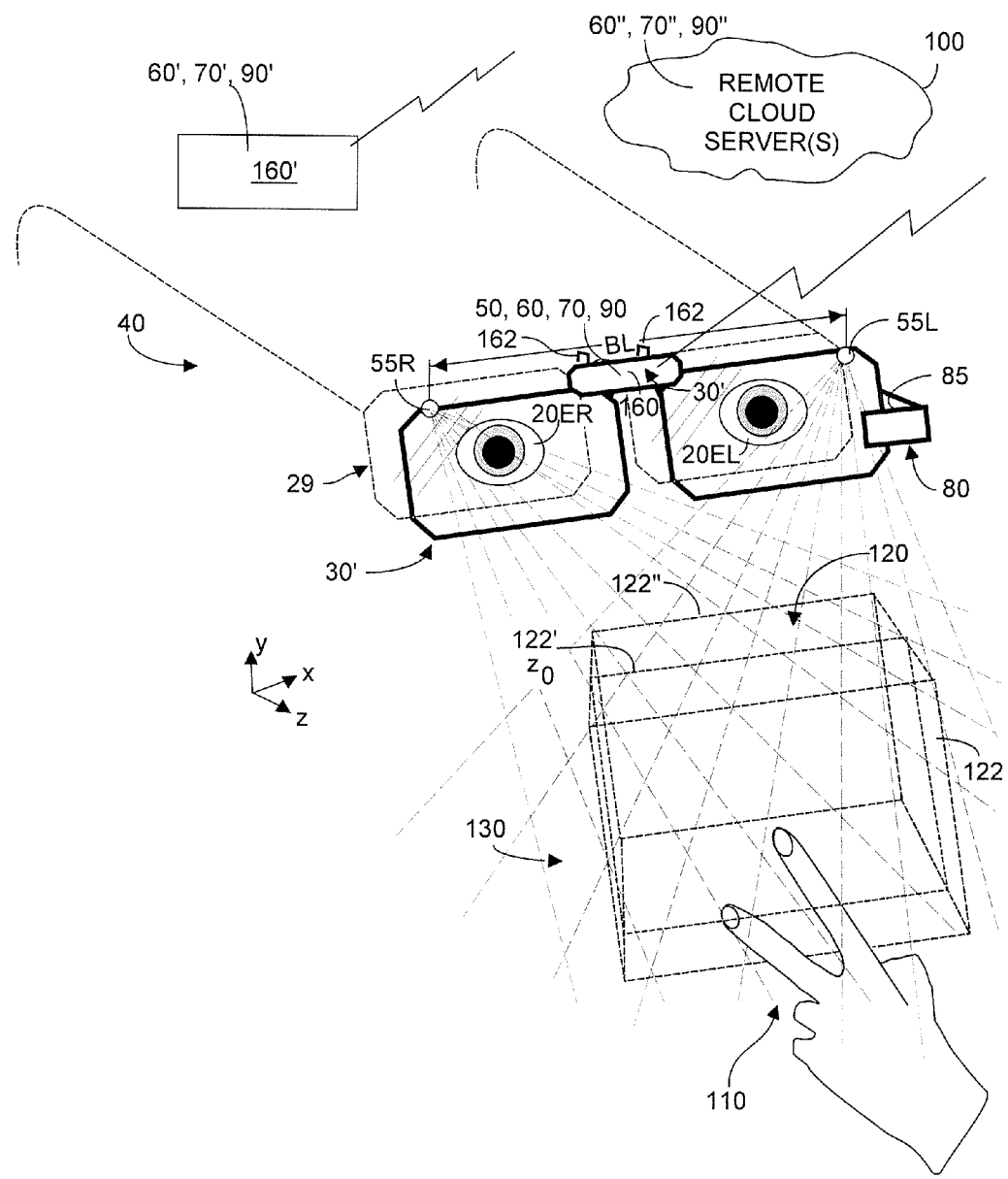
FIG. 2B is a perspective view of a system mounted on or in clip-on eye glasses that clip on to a user's normal eye glasses and include an optical acquisition system having a pair of spaced-apart two-dimensional usable to recognize gestures, and showing a plane of interaction region within a larger hover zone, according to embodiments of the present invention.

FIG. 2B shows a spaced-apart view of a pair of ordinary eye glasses 29 to which a clip-on embodiment of the present invention 30' has been attached by means of clip-on hinges 162 or the like. Glasses system 40 may be identical to what was described in FIG. 2A, although for ease of illustration clip-on glasses 30' in FIG. 2B do not show optional light source 57, or microphone 59. Physically clip-on glasses 30' might outwardly appear as an ordinary pair of clip-on sunglasses of the type that a wearer of eye glasses 29 might use in bright sunlight. However glasses 30' preferably includes a built-in or built-on housing 160' within which is disposed elements of optical acquisition system 50, signal processing system 60, video generating system 70, I/O system 90 and a battery power supply. Glasses 30' also includes display 80 that enables the user wearing glasses 29 and clip-on glasses 30' to view virtual or two-dimensional projected display imagery 85. FIG. 2B also shows three of the many parallel planes 122, 122', 122" that may be defined within three-dimensional interaction sub-region zone 120.

In the various embodiments, virtual display 80 may be a commercially available unit such as a miniature LCD with optical magnification. Of course in embodiments where clip-on glasses 30' are used with an external display monitor, e.g., 150 in FIG. 1, virtual display 85 could be omitted, or provided as a modular add-on component. Light weight and a small form factor are especially important in the clip-on embodiment of FIG. 2B and a remote system housed in 160' preferably includes signal processing system 60', video generation system 70', and I/O system 90', which systems preferably perform at least some and possibly all of the functions of systems 60, 70, 90 in housing 160. Communications between the systems in housing 160, which can be downsized in processing overhead, and the systems in housing 160 is provided wirelessly (indicated by zig-zag lines) via I/O systems 90, 90'. Remote housing 160' might be sized to fit in a user's pocket or purse. In some embodiments, housing 160' may in fact be the user's smart phone, where in-glasses 30' signal processing system 60 exports via I/O system 90 a compact digest of the video acquired by cameras 55L, 55R. This digest may include a clipped section of the video, significant image features, selective disparity maps, etc. Such processing offloading would contribute to reduced latency and power consumption within clip-on glasses 30'. Of course off-clip-on glasses processing could also or instead be wirelessly exported to a networker server, e.g., 100. Once any externally carried out signal processing is complete, the processed video data is communicated wirelessly, e.g., via I/O system 90' in external housing 160', and/or via I/O system 90" in cloud network server(s) 100 back to I/O system 90 in housing 160 for use in created imagery 85 displayed or projected on virtual display 80, or displayed via wireless communication on an external monitor, e.g., monitor 150 in FIG. 1.

In the various embodiments of the present invention, cameras 55L, 55R are preferably generic two-dimensional inexpensive cameras such as OmniVision (see www.ovt.com) models OV7740 or OV9726, and acquire two-dimensional gesture image data in interaction sub-region zone 120 from their two vantage points. The commercially available camera (s) have a horizontal FOV-H≈50° and vertical FOV-V≈40°. Although these FOVs are less than 90°, these cameras perform quite adequately for gesture sensing according to the present invention. In high quantity, unit price of such cameras can be less than a few dollars. Cameras 55L, 55R capture image data substantially simultaneously under control of signal processor system 60 and/or 60' and/or 60" and are typically operated at 30 frames/sec. although 60 frames/sec. could be used if rapidly moving user objects 110 are to be imaged without blur. These cameras typically employ a rolling or global shutter. If the cameras were perfect, exposures would start and end exactly simultaneously. In practice, if exposure duration is 8 ms, a start of exposure and end of exposure tolerance of about ±1 ms is acceptable, and for a 16 ms exposure, start of exposure and end of exposure tolerance of about ±1.5 ms is acceptable. Thus "substantially simultaneous" operation of cameras 55L, 55R is understood to mean simultaneous within a tolerance ≤±1.5 ms or ≤±10% of camera exposure duration. Since generic two-dimensional cameras 55L, 55R such as model OV7740 VGA can synchronize exposure relative to each other in sub-millisecond time, such tolerances are readily met. For example a user's hand may move rapidly at perhaps 100 mm/sec, which is a 0.1 mm movement in 1 ms, well within the tolerance for recognizing natural user interfaces. Motion blur during image acquisition is reduced preferably by operating each camera at a maximum gain, with commensurate shutter times of about 3 ms to about 5 ms.

Typically cameras 55R, 55L are substantially identical with respect to their camera sensor array pixel resolution, sensor pixel wavelength sensitivity, and fields of view. However glasses 40 can be implemented using a pair of cameras that are dissimilar in at least one of these characteristics. Distance BL and angular orientation of the cameras with respect to each other and with respect to glasses 30 are assumed to remain fixed within certain tolerances for the life of glasses 30. Slight camera movements with respect to the device can be calibrated by the user or with auto-calibration methods. Advantageously a cross-section of hover zone 130 parallel to the plane of glasses 30 can far exceed the baseline magnitude BL or BL', which promotes comfortably large hover zones 130 and interaction sub-region zones 120.

Figure 3A:
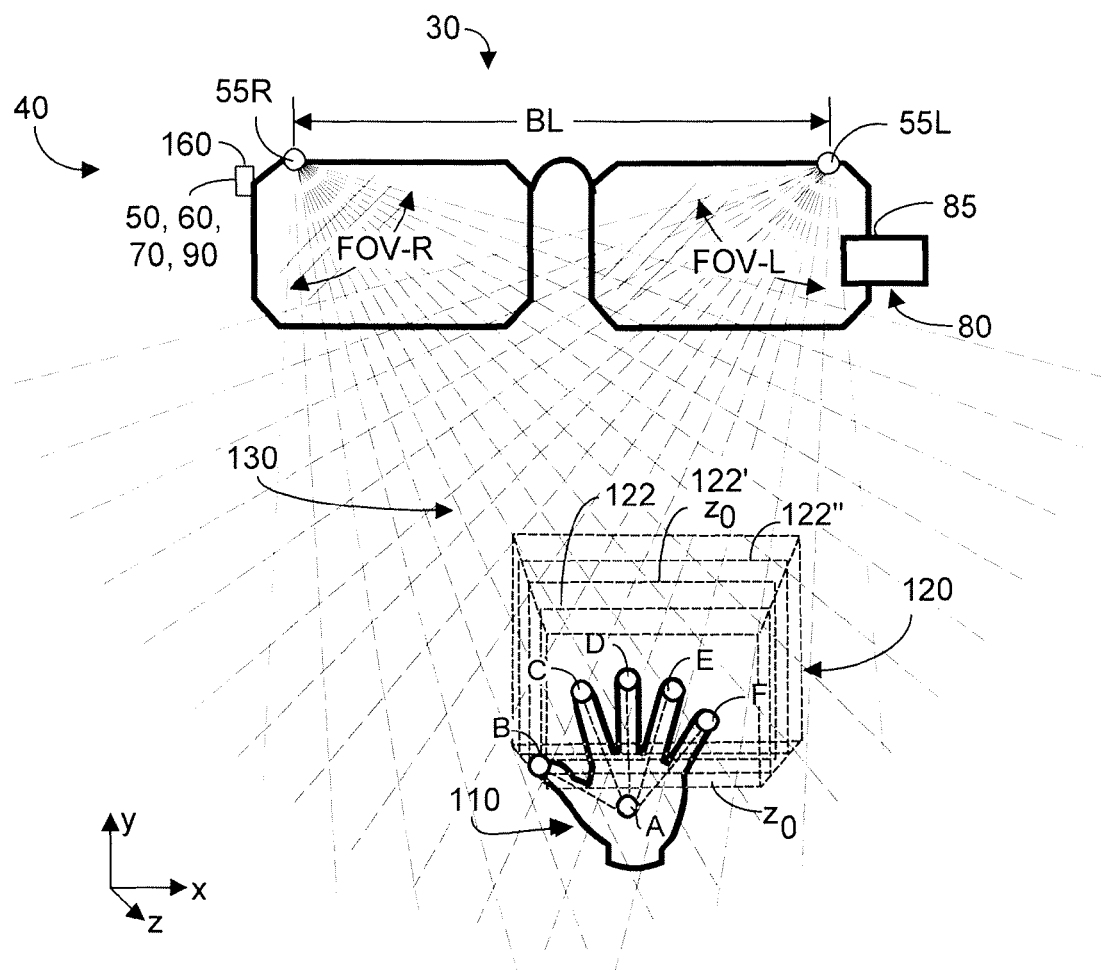
FIG. 3A is a front view of a glasses device whose optical acquisition system includes at least two two-dimensional cameras, usable to recognize gestures, and showing a three-dimensional interaction region within a larger hover zone according to embodiments of the present invention.
Figure 3B:
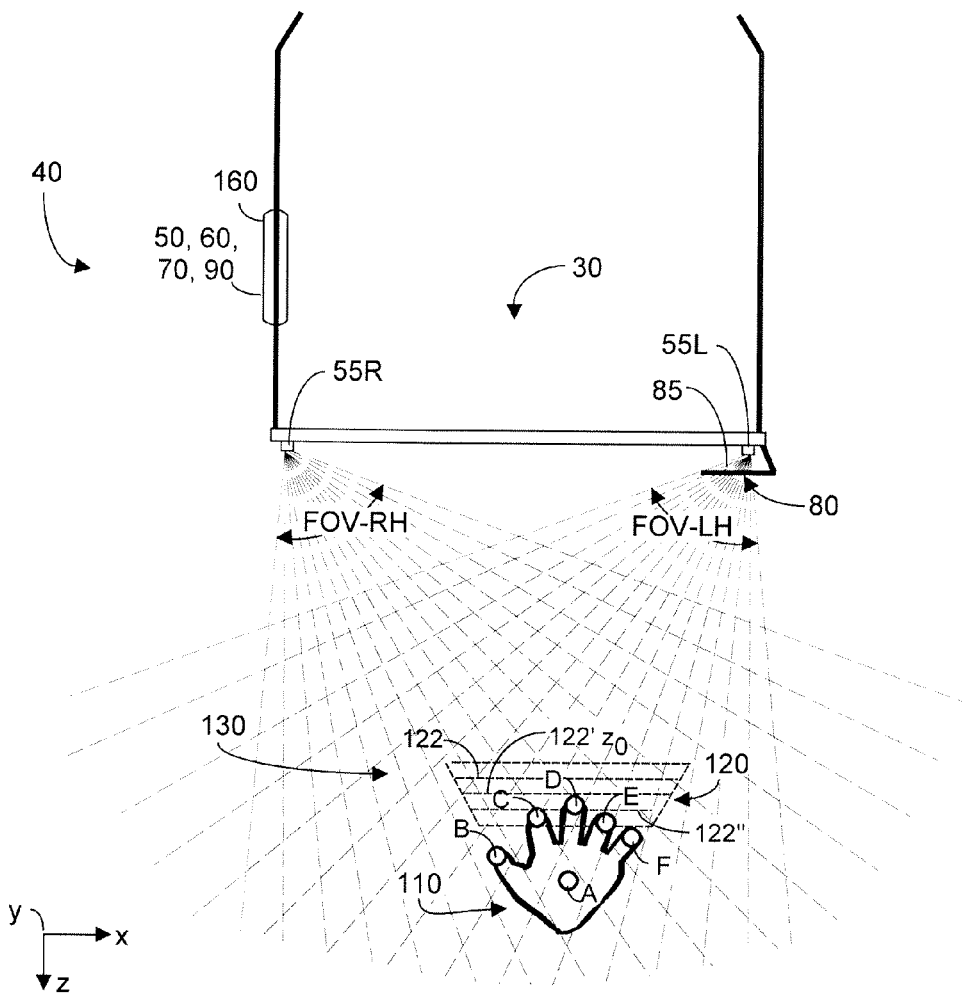
FIG. 3B is a top view of the glasses device of FIG. 3A depicting only the upper most camera pair, according to embodiments of the present invention.
Figure 3C:
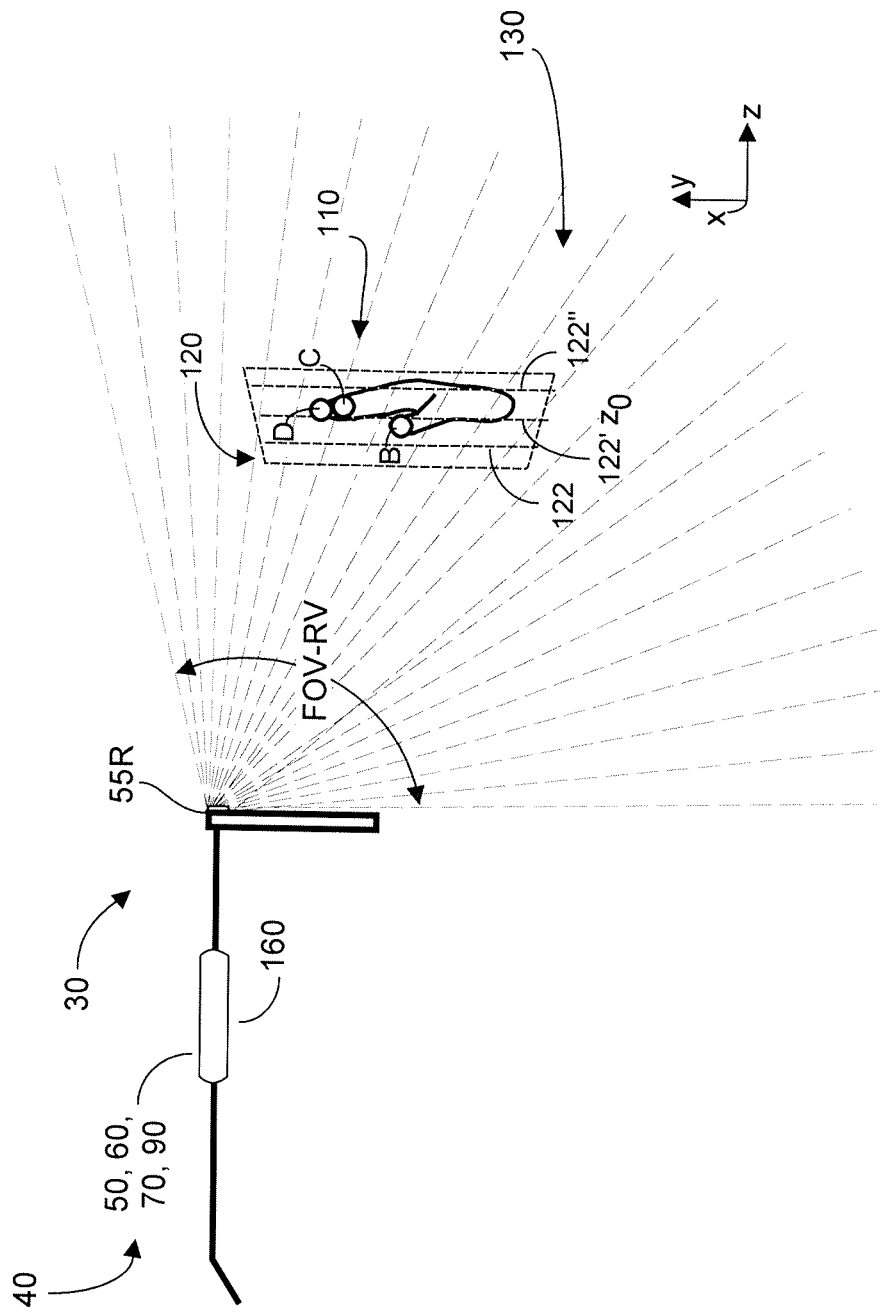
FIG. 3C is a side view of the portable device of FIG. 3A.

FIGS. 3A, 3B, 3C are respectively front, top, and side views of glasses 30, wherein optical acquisition system 50 includes two two-dimensional cameras 55L, 55R, spaced-apart distance BL. These figures depict three-dimensional interaction sub-region zone 120 and hover zone 130 from different perspectives. The three-dimensional FOV volume of each camera is depicted with straight phantom-line rays converging at the lens of each camera, and is shaded light gray of ease of understanding. Interaction sub-region zone 120 is the region of actual user object 110 interaction with camera system 40 at any time and comprises a large number of parallel planes, one of which (plane $z_0$) is the first portion of zone 120 with which user object 110 interacts. Plane $z_0$ may but need not be defined parallel to the plane of glasses 30.

Turning now to FIG. 3A, a front view of glasses 30 is shown as an embodiment using upper most mounted cameras 55R, 55L separated by baseline distance BL. For ease of illustration optional components such as optional active light source 57 and microphone 59 are not depicted, and user 110 is depicted only as eyes and left hand 110. In this view three-dimensional hover zone 120 is defined by the intersection of the FOV-R of camera 55R with the intersection of the FOV-L of camera 55L. Optical acquisition system 50, e.g., two-dimensional cameras 55R, 55L, captures gesture information as frames of two-dimensional video data of user object 110 (user hand or hand(s)) within sub-region 120, shown as comprising a plurality of parallel virtual planes including planes 122", 122' ($z_0$) and 122. Thus in FIG. 3A, the user's hand or finger(s) 110 initially interacts with plane 122' ($z_0$) and upon moving away from glasses device 30 (increasing magnitude of z) will encounter other planes, including for example plane 122, within larger three-dimensional hover zone 130.

An exemplary optical acquisition system 50 rate of capture might be 30 frames/sec, or for very rapid hand motions perhaps 60 frames/sec. Cameras 55R, 55L may acquire a great quantity of image data, however the present invention defines only a relatively few landmark points on key portions of the user object 110. For example in FIG. 3A user object 110 (a hand) may be skeletonized as a group of landmark points or centroids such as "A" at the palm center, with straight lines from "A" going to "B" at the right thumb tip, "C" at the right forefinger tip, "D" at the right middle finger tip, "E" at the right ring finger tip, and "F" at the right little finger tip. As described in detail later herein, signal processing system 60 preferably identifies acquired optical image information as a few, perhaps less than a dozen, landmark points such as A, B, C, D, E in (x,y,z), which landmarks serve as semantic clues as to what is being imaged, and discards other data as superfluous. In this fashion, signal processing system 60 can very rapidly process a spare set representing a minimum amount of (x,y,z) landmark data to adequately and accurately identify gestures, while discarding the majority of potential data in the frames of imagery acquired by cameras 55L, 55R. Signal processing system 60 as well as optical acquisition system 50 (except for cameras 55L, 55R), video generation system 60, and I/O system 90 preferably are disposed in housing 160, shown in FIG. 3A as being attached to the right temple of glasses 30. In FIG. 3A signal processing system 60 causes video imagery 85 seen by user 110 to appear on display 80, which video is dynamically alterable responsive to user gestures recognized by glasses system 40. As noted, if glasses 30 do not include on-glasses display 80, I/O system 90 can wirelessly transmit dynamically alterable video to an external device, such as a smart phone, smart TV or netbook 150 (see FIG. 1). Alternatively, system 40 may just transmit gesture commands to interact with imagery 85 that may be produced by an external display 150 (see FIG. 1).

FIG. 3B is a top view of glasses 30 depicted in FIG. 3A, and as shown the y-axis extends upward from the x-y plane. Depicted are the horizontal fields of view (FOV-RH) for camera 55R, which preferably has the same field of view (FOV-LH) as camera 55L. Exemplary horizontal FOVs will typically be in a range of about 40° to about 60°. Interaction subzone 120 is shown with the user's finger tips 110 beginning to intersect virtual plane $z_0$ defined within interaction sub-region zone 120.

FIG. 3C is a side view of glasses 30, and depicts the vertical FOV component FOV-RV for camera 55R. (For ease of illustration, display 80 is not depicted in FIG. 3C.) FOV-RV (and FOV-LV for camera 55L) is in a range of about 40° to about 90°. In practice each camera preferably is tilted at a so-called vergence angle of perhaps 5° such that the optical axes of the cameras are not parallel but rather slightly inclined toward each other, to attain a desired hover sub-zone 120 region. Such tilting can make hover zone region 120 sufficiently large to image multiple nearby objects simultaneously, perhaps the user's left and right hands, manipulated for some gestures. FIG. 3C also depicts exemplary virtual planes 122, 122' ($z_0$), and 122".

Figure 4A:
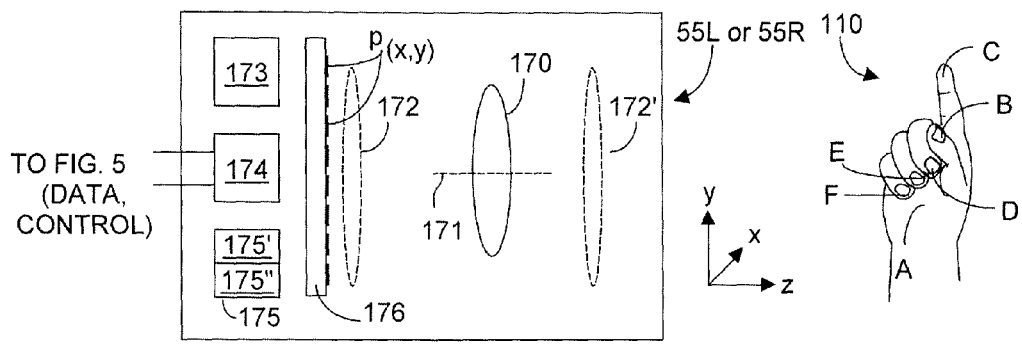
FIG. 4A is a block diagram of a generic two-dimensional camera used to optically acquire gesture information, according to embodiments of the present invention.

It is useful to consider FIG. 4A at this juncture, in which a block diagram of an exemplary two-dimensional camera 55L, 55R is depicted, with user object 110 and exemplary landmark points, A, B, C, D, E, F. Each camera preferably includes a shutterable lens 170 having a lens optical axis 171, optional filters 172, 172', and an image plane comprising a planar array 176 of sensor pixels $p_{(x,y)}$ arranged in rows and columns. Each such camera preferably further includes optional processor/controller 173, control and communication interface I/O circuitry 174, and optional in-camera memory 175, which may include non-volatile memory 175' and non-volatile memory 175". Non-volatile memory 175' can store camera calibration and other configuration data, while volatile memory 175" can support processor programming and store temporary runtime data.

In FIG. 4A, camera sensor array 176 is typically fabricated using CCD or CMOS processes and may be a relatively high resolution RGB (color), or gray-scale sensor array, or even an IR sensor array. Density of pixels $p_{(x,y)}$ in each camera's sensor array depends upon several factors including the smallest gesture movement made with a pointing finger that must be detected, the vertical FOV-V and horizontal FOV-H camera fields of view, and image frame size to be acquired and processed. The earlier-noted OmniVision model OV7740 VGA two-dimensional camera has a sensor array with pixel density 480 h×640 v, which is adequate for cameras 55L, 55R, etc. to recognize gestures according to embodiments of the present invention. If cameras 55L, 55R are RGB, preferably integrated color filters 172 are employed, arranged in a so-called Bayer pattern over the pixels on a per-pixel basis. If glasses system 40 includes an active light source 57 that emits IR that is detectable by a camera sensor pixel array 176, at least one of filters 172, 172' can be an optional IR bandpass filter. Such filtering can discern between user objects 110 illuminated by ambient light rather than by IR optical energy. The IR filter can be omitted, enabling visible and artificial IR illumination to reach each camera sensor array, thus taking advantage of both ambient and IR light for dark scenes. Light source 57 (see FIG. 1) might be synchronously activated to coincide with frame captures by cameras 55L, 55R. Camera processors/controllers 173 may also provide such relatively minimal color and exposure correction as may be desirable to better detect user gestures, perhaps to discern user object 110 skin color from other color. While FIG. 4A shows lens 170 and sensor array 176 centered on a common optical axis 171, in practice a slight offset may be present. Embodiments of the present invention can cope with optical distortion associated with inexpensive lenses 170 found in generic inexpensive cameras 55L, 55R. As described elsewhere herein, (x,y,z) camera coordinates of each landmark are converted to ($x_w, y_w, z_w$) common world coordinates, using previously determined and stored camera 55L, 55R extrinsic parameters.

Figure 4B:
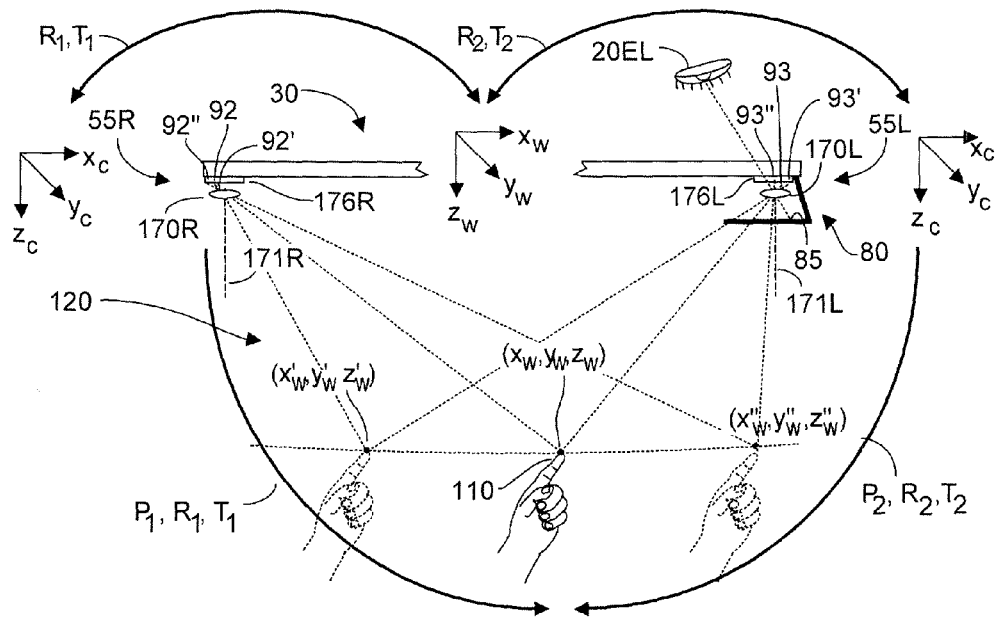
FIG. 4B is a diagram depicting mapping between camera coordinates, real world coordinates, and virtual display coordinates, according to embodiments of the present invention.
Figure 4C:
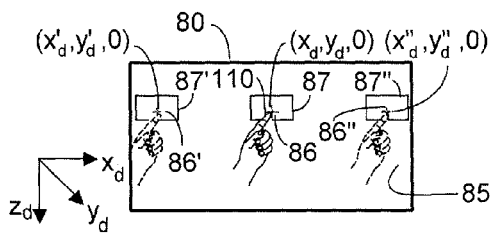
FIG. 4C depicts the user's view of imagery seen on the glasses display for the exemplary configuration shown in FIG. 4B, according to embodiments of the present invention.

FIG. 4B and FIG. 4C depict mapping between camera coordinates ($x_c, y_c, z_c$) associated with cameras 55R, 55L, their respective sensor arrays 176R, 176L, their respective lenses 170R, 170L, and their respective optic axes 171R, 171L, according to embodiments of the present invention. FIG. 4B also depicts mapping of real-world coordinates ($x_w, y_w, z_w$) associated with the actual three-dimensional position of user object 110, and coordinates ($x_d, y_d, 0$) associated with display 80 and virtual imagery 85 viewed thereon by the user of glasses 30. In practice, looking through the left lens of glasses 30 the user sees virtual imagery 85 depicted on display 80, or perhaps similar imagery 85 depicted on an external device display 150 (see FIG. 1). In FIG. 4B, user object 110 is the distal portion of the user's pointing finger, which has real world coordinate position ($x_w, y_w, z_w$), which location appears on display 8 as virtual0 display coordinate ($x_d, y_d, 0$). Note that three different positions for the user's hand and forefinger 110 are shown in FIG. 4B. The center position of the three positions is the actual position of the user's hand and forefinger and has real world coordinates ($x_w, y_w, z_w$), and will appear at coordinate ($x_d, y_d, 0$) on virtual imagery 85, as shown in FIG. 4C. As shown in FIG. 4C, a virtual image, here a virtual menu selection button 87 is superimposed on that same virtual display coordinate position.

Referring to FIG. 4B and FIG. 4C, assume the user sees virtual menu buttons 87', 87, 87" displayed left-to-right as imagery 85 on display 80 and wishes to "select" virtual menu button 87, displayed at virtual display coordinates ($x_d, y_d, z_d=0$). Note in FIG. 4C that virtual buttons 87' and 87" are shown as being at the left and right margins of imagery 85 as produced by display 80. While viewing this imagery 85 the user's forefinger 110 (in this example) is moved in real world three-dimensional space to real world coordinate position ($x_w, y_w, z_w$). When finger 110 is at this real world position, the user's left eye 20EL will appear to see superposition of a marker or cursor 86 (see crosshair 86 in FIG. 4C) commensurate with position of forefinger 110 and virtual menu button 87. Depending upon the software being executed by glasses system 40, the user can confirm the selection perhaps by holding the forefinger on the virtual button for a minimum time, perhaps 0.2 second, or perhaps by virtually pushing the virtual menu button. The user's forefinger could push outward in real-world space, a movement that would manifest as a change in z-coordinate, which change is readily sensed by optical acquisition system 50.

With reference to FIG. 4C, assume the user instead wishes to select virtual menu button 87" at the right edge of imagery 85 as produced by display 80. In this example the user's hand and forefinger will be moved to the right (from the user-glass wearer's perspective) to real world coordinate location $(x''_w, y''_w, z''_w)$. The user's left eye 20EL will now see a marker or cursor shown as crosshair 86" in phantom, commensurate with the forefinger superimposed on virtual button 87" at display coordinate location $(x''_d, y''_d, 0)$. If, however, the user wishes to select virtual button 87' at the left edge of display 80, the user moves hand and forefinger 110 to left (from the user's perspective) to real world coordinate location $(x'_w, y'_w, z'_w)$, whereupon the user's left eye will now see crosshair 86' (drawn in phantom) with the forefinger superimposed on virtual button 87' at display coordinate location $(x'_d, y'_d, 0)$.

Figure 4D:
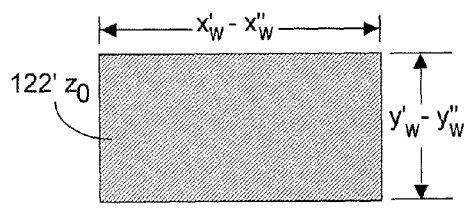
FIG. 4D depicts an exemplary plane from the interaction sub-region zone, sized to accommodate imagery displayed in FIG. 4C, according to embodiments of the present invention.

The above examples demonstrate how the user can navigate the entire display 80 in both x and y directions by moving a user object (i.e., index finger 110) in the real-world within interaction sub-region zone 120. As noted earlier, interaction sub-region zone 120 is created and defined at a comfortable arm's-length z distance from the user, perhaps 1M; see FIG. 1. Embodiments of the present invention further define a substantially rectangular volume 120 at the z distance to user object 110, which volume defines the x,y,z bounds of the relevant interaction sub-region zone. FIG. 4D depicts an x-y cross section of interaction sub-region zone 120, which zone will be sized to accommodate user object 110 hand positions $(x'_w, y'_w, z'_w)$ and $(x''_w, y''_w, z''_w)$ at the edges of this zone. Thus in FIG. 4D the x-dimension width of plane 122' is sized to be the difference between $x'_w$ and $x''_w$. Similarly in the y-dimension, height of plane 122' will be the difference between $y'_w$ and $y''_w$. For ease of illustration, FIG. 4B shows the mapping relationship (viewed from the top in primarily the x lateral direction) from real world positions $(x'_w, y'_w, z'_w)$, $(x_w, y_w, z_w)$, and $(x''_w, y''_w, z''_w)$ to camera image plane pixel positions 92', 92, and 92" for camera 55R, and camera image plane pixel positions 93', 93, and 93" for camera 55L. FIG. 4C depicts corresponding respective virtual display locations 87', 87, and 87" in substantially the x-y display plane.

In FIG. 4B and FIG. 4C, mapping between real and virtual points has been shown using geometric drawings, with boundary or edge regions noted in FIG. 4C to illustrate the reach of user object 110 to the edge boundaries of the interaction sub-region zone 120. FIG. 4C and FIG. 4D further demonstrates presentation as part of imagery 85 of a cursor-like object, i.e., crosshair 86',86,86", that moves around display screen 80 commensurate with the natural motion of user object 110 in a relevant plane 122' or $z_0$ in interaction sub-region zone 120. Actual mapping preferably is performed by a one time calibration process that for each camera 55L, 55R maps camera coordinates $(x_c, y_c, z_c)$ to common global or real-world coordinates $(x_w, y_w, z_w)$. This calibration process produces the so called camera intrinsic parameters referred to earlier for the projection from three-dimensional space to two-dimensional image plane, as well as rotation and translation matrices for coordinate mapping, collectively called $(P_1, R_1, T_1)$ for camera 55R and $(P_2, R_2, T_2)$ for camera 55L. Relationship of this projection and three-dimensional rotation-translation nomenclature is depicted in FIG. 4B with bolded curved lines going generally from camera 55L and 55R to user object 110.

In practice, according to embodiments of the present invention the user preferably defines location of interaction sub-region zone 120, which is bound by and within larger hover zone 130. Location definition preferably uses at least one specific gesture known a priori to glasses system 40, perhaps wagging forefinger 110 within hover zone 130 for at least a minimum time. Imagery 85 presented on display 80 such a cursor 86, 86', 86", and/or a phantom hand depiction (see FIG. 12B) provide real time visual feedback to clue the user as to response of system 40 to such specific gesturing. The active interaction sub-region zone 120 will remain substantially in the same approximate world (x,y,z) location while this specific gesture is active. Advantageously the user can relocate interaction sub-region zone 120 to another more comfortable location, perhaps when switching from right hand to left hand during a gesture.

According to the present invention, successful gesture recognition is promoted by knowing or obtaining intrinsic (or geometric or projection) parameters, extrinsic device parameters, and camera registration with respect to each other and with respect to glasses device 30. In practice this information is acquired during one or more calibration steps that may be carried out during manufacture of camera system 40. Initially the intrinsic or geometric parameters of each camera 55L and 55R will have been determined, including camera lens focal length, horizontal and vertical pitch of pixels $p_{(x,y)}$ in the camera array 176, FOV-H, FOV-V, and optical distortion parameters $k_i$. Thus calibration parameters for each camera 55L, 55R, etc. preferably are determined and thereafter known a priori and are stored in in-camera memory 175' (see FIG. 4A) and/or in memory 64 associated with signal processing system 60 (see FIG. 5). During runtime operation of glasses system 40, signal processing system 60 (and/or 60' and/or 60") uses these stored camera parameters and any stored glasses device 30 parameters to correct or at least reduce errors including camera distortion. Such correction tends to make cameras 55R, 55L appear to be ideal pinhole cameras. As a result, analysis occurs in the processor block signal processor system and cameras 55R, 55L are treated as ideal pinhole cameras. So-doing enables use of extrinsic rotation-translation parameters, e.g., P, R and T described herein to correctly reconstruct three-dimensional $(x_w, y_w, z_w)$ positional coordinates for any landmark acquired by glasses device 30 relative to a glasses-mounted camera, e.g., 55L or 55R, and relative to a global coordinate system, e.g., relative to a common reference for the purpose of three-dimensional reconstruction.

For purposes of intrinsic calibration, each camera is deemed equivalent to a ray-based optic device that projects rays of incoming light via the camera lens 170 to pixels $p_{(x,y)}$ on its sensor array 176, where the three-dimensional cone of such rays define the camera FOV. Intrinsic calibration determines correct mapping between the rays and pixels in the sensor array for each camera. Once the camera is calibrated, the forward projection from a ray of light to a pixel in the sensor array, and a backward projection from a pixel to the ray of light are known. After the cameras are fixedly mounted to glasses device 30, extrinsic system calibration determines each camera's extrinsic properties. These extrinsic properties include the two-dimensional pixel coordinates $p_{(x,y)}$ of each camera's sensor array 176, with respect to the outside world. These extrinsic properties further include each camera's rotation and translation matrices, respectively R and T, with respect to the $(x_w, y_w, z_w)$ external world common coordinate system associated with glasses device 30 (see FIG. 5). Such a priori knowledge of the collective geometric properties of the cameras 55L, 55R, etc. and glasses device 30 can be used to locate landmark positions for user-objects 110 in three-dimensional interaction sub-region zone 120, within hover zone 130.

Many calibration methods are known in the art, e.g., "Flexible Camera Calibration by Viewing a Plan from Unknown Orientations", Zhengyou Zhang, Microsoft Research, Redmond, Wash. 98052. Preferably calibration does not require knowledge of the camera orientation, and starts by defining a camera reference system that need not be accessible external to the camera. That is, one cannot readily measure location of a real world object with respect to that reference coordinates until calibration is completed and the camera is registered to an external world coordinates. Such approach is a convenient mathematical concept to derive camera calibration parameters.

Figure 5:
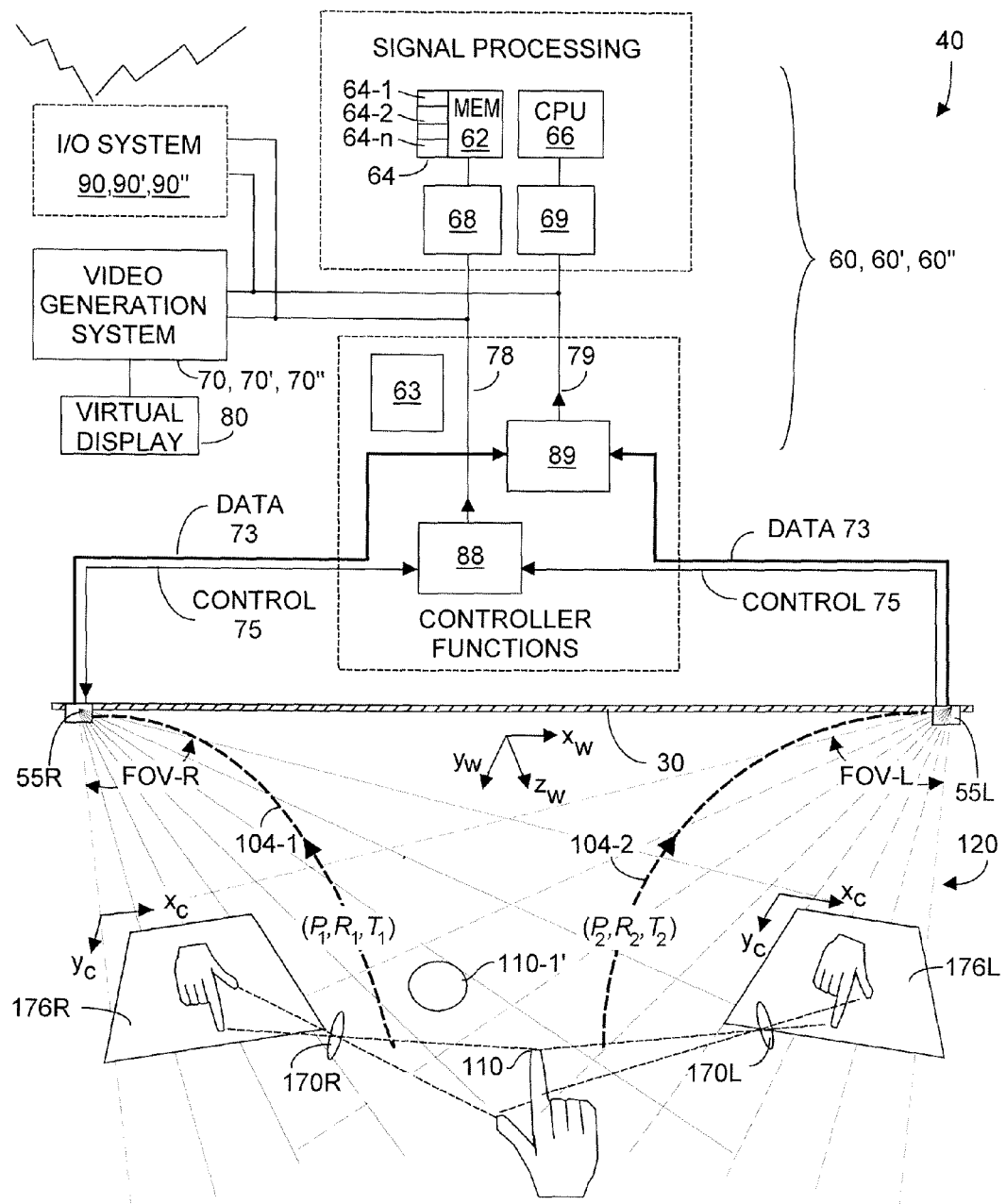
FIG. 5 is a block diagram of a glasses system employing a two two-dimensional camera optical acquisition system, according to embodiments of the present invention.
Figure 6A:
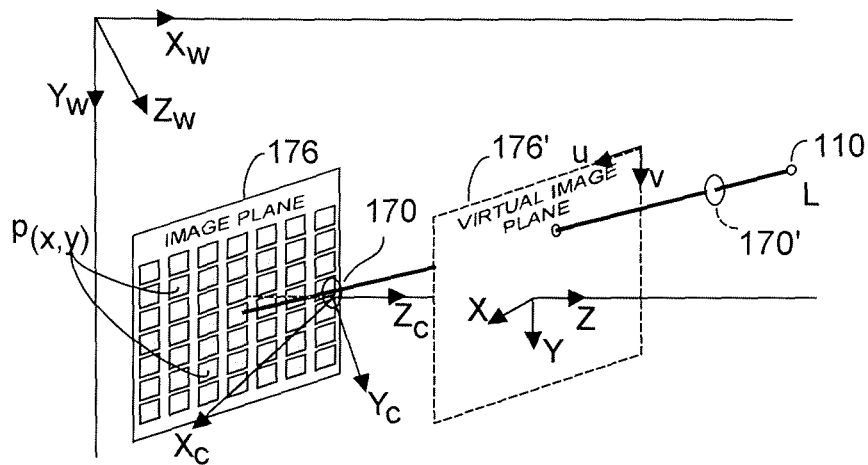
FIG. 6A depicts the relationship between world coordinates and local coordinates, according to embodiments of the present invention.

What can be determined is the (sub) pixel location of an external landmark (like a corner of a checkerboard) in the camera pixel sensor image plane 176 (see FIG. 4A, FIG. 6A). Accordingly, patterns that preferably are on a common plane are imaged during calibration, and have landmarks that are well defined with respect to each other. Such calibration involves first defining a visible pattern on a plane surface, e.g., a repeated checkerboard pattern. Next the locations of pattern landmarks (e.g., corner points on the checkerboard) are measured precisely with respect to a known position on the pattern. The pattern is maintained steadily to fill the camera's FOV, and an image is captured by the camera. Corner milestones in the pattern are identified with sub-pixel resolution in the camera pixel sensor image plane. Calibration precision is enhanced by repeating this measurement several times, with different images of the same pattern. Correspondences between the landmarks and their respective (sub)pixel locations in the image plane are input to a cost-minimizing calibration algorithm. The calibration calculation preferably runs in an offline processor, i.e., external to glasses 30, and resulting data can be stored within camera memory 175' and used by algorithms 64-1, 64-2, etc. stored in memory 62 within signal processor system 60 (and/or 60' and/or 60"), see FIG. 5.

Calibrating camera intrinsic and extrinsic properties is typically done once in the lifetime of a camera. Acquired calibration data should be valid for the life of the camera absent significant positional shifts inside the camera, and between mounted cameras 55L, 55R, etc., relative to each other and to the housing of the cameras. One might, however, develop procedures to regenerate such data after the camera has been mass produced. But in practice, gathering and storing the various calibration information is preferably done during manufacture of the cameras and/or glasses 30 (or clip-on glasses 30'). So doing further conserves glasses system 40 processing power, as does processing with the cameras of time-invariant calculations. Calibration precision is a function of how well calibration mapping can be estimated, and the quality of calibration should be commensurate with the precision requirements of the application. For example, recognition of gestural interfaces may not require the low mm or sub-mm metrology demanded by touch screen specifications. As shown in FIG. 5, the signal processing system preferably provides flash memory 63 to preserve configuration data that includes calibration data describing geometric properties, i.e., intrinsic and extrinsic parameters, for each camera 55L, 55R, etc.

FIG. 5 is a block diagram systemic view of a preferred embodiment in which optical acquisition system 60 includes two-dimensional cameras 55L, 55R. (Present but not shown in FIG. 5 is a battery power supply that provides operating power to glasses system 40.) As shown, overall glasses system 40 includes signal processing system 60 (and/or 60' and/or 60", which carries out signal processing as well as system control functions. The nomenclature 60 and/or 60' and/or 60" means some or all of the functions of the signal processing system may be carried out on or in glasses 30, or at least in part in a corresponding signal processing system associated with cloud network server 100 (see FIG. 1), or at least in part in a correspond signal processing system associated with a module or housing 160' external to glasses 30 but physically close to the user. This same nomenclature will be used elsewhere with respect to other system functions that may be carried out on or in the glasses, in a cloud network server, or in an external module or housing, etc.

At the upper portion of FIG. 5 memory 62 stores algorithmic and other routines 62-n that are executed and controlled by processor/CPU 66 to carry out gesture recognition and signal processing functions, according to embodiments of the present invention. Under synchronous control of processor/CPU 66, frames of data acquired by cameras 55L, 55R, etc. are used by at least one software algorithm, e.g., 62-1, to perform signal image processing as needed. Upon execution by CPU/processor 66, relevant routines stored in memory 62, 64 perform tasks including, for example, three-dimensional reconstruction of landmarks identified on user-object(s) 110, as well as gesture identification using ideal camera modeling, epipolar lines, and other techniques described herein.

In FIG. 5, blocks 68, 69 represent driver modules, e.g., USB, MIPI, I2S, etc., that provide software interface for the signal processing system, and interface via respective lines 78, 79 with controller logic circuitry 88, 89. As shown, control logic 88 interfaces with CONTROL signals on line 73 (drawn in bold for ease of following the line), and control logic 89 interfaces with DATA signals on line 73. Driver modules 68, 69 provide software interface for the DATA and CONTROL lines. In response to instructions from CPU 66, control logic 88 preferably broadcasts synchronization signals to cameras 55L, 55R via communications channels comprising the DATA 73 and CONTROL 75 lines, and a ground line. Synchronization can be a simple signal to each camera to control exposure start and stop. If camera system 40 includes an active light source 57, synchronization can optionally include camera exposures with and without the active light source, where signal processing can compare the sets of acquired images to improve signal quality.

In general, CONTROL line 75 is used to send/receive commands, synchronization signals, and queries to/from cameras 55L, 55R, and DATA line 73 is used to aggregate data and transfer frames of camera-acquired images substantially synchronously from cameras 55L, 55R. The control function of the signal processing system manages collection of camera image frames at a preprogrammed frame rate, perhaps 30 frames/sec. or 60 frames/sec. as set by a software algorithm, e.g., 64-n, stored in memory 62, and executed by CPU 66. Preferably the cameras acquire their images substantially simultaneously, which in practice means camera exposures are synchronized to each other within about ±1.5 ms. Alternatively one of the cameras can assume the role of controller and send a synchronization signal to the other camera, thus reducing overhead for CPU/processor 66. Camera captured image data awaits its turn to transmit frame information via DATA line 73, e.g., via logic unit 89. At appropriate times aggregated data frames are transmitted via line 79 to CPU 66. Wireless rather than wire control lines could be implemented using BlueTooth for example if sub ms latency can be provided. DATA and CONTROL and other bus lines want to transmit data frames at a rate commensurate with glasses system 40. For example if camera pixel sensor arrays 176 had say 640·480 pixel density, and data transmission was at 30 frames/sec. with 24 bits/pixel, then available bandwidth should be at least 221 Mbits/sec. However this figure may be somewhat high in that actual USB level bandwidth calculation depends upon transmission coding used by the cameras, e.g. Bayer pattern, in transmitting their data and where on the array a given RGB pixel is constructed, etc.

The upper left portion of FIG. 5 shows video generation system 70 and/or 70' and/or 70", which system can create video imagery 85 presented for user viewing on display 80 (see FIG. 1). Alternatively, the user may view displayed video imagery on a monitor external to glasses 30, such as display monitor 150 in FIG. 1. Also shown at the upper portion of FIG. 5 is I/O system 90, which enables glasses 30 to communicate wirelessly, e.g., via WiFi, BlueTooth, etc., with cloud network server(s) 100, with off-glasses modules 160' that are perhaps in the user's pocket or purse, and with smart monitors 150.

A lower portion of FIG. 5 shows schematically cameras 55L, 55R mounted on glasses 30, and their respective camera fields of view FOV-L, FOV-R. At the bottom of FIG. 5, image planes 176L, 176R, and lenses 170L, 170R are an exploded depiction respectively of the images planes and lenses of cameras 55L and 55R attached to glasses device 30. Phantom lines emanating from cameras 55L, 55R represent light rays from points on the user object 110 to image points on the respective camera image planes 176L, 176R. These light rays pass through respective camera lenses 170L, 170R. FIG. 5 also depicts graphically and schematically the transformation of two-dimensional coordinates $(x_c, y_c)$ from the individual camera 55L, 55R image planes 176L, 176R (see also FIGS. 4A, 6A-6C) to a common global coordinate system $(x_w, y_w, z_w)$ that preferably is referenced to a location on glasses 30. In FIG. 5, arrowed lines 104-1, 104-2 depict the manner of these transformations, which involve the (P,R,T) projection, rotation-translation parameter transformation described in detail elsewhere herein.

As used herein, skeletonized images represent gesture data, e.g., a user's hand 110 making a pointing gesture, which recognized skeletal landmark-defined image can be matched to gesture information stored in memory 62, 64 in signal processor system 60. Initially signal processor system 60 (and/or 60' and/or 60") initially seeks to identify user object 110, e.g., a user's wrist and hand, from (x,y) information acquired by cameras 55L, 55R, perhaps using shape information. Next the user's fingers can be identified and one finger can be identified as the primary or forefinger 110 in the image plane 176 of at least one of the cameras 55L, 55R. Next the forefinger tip landmark, "C" in FIG. 3A, representing the sub-pixel address in the sub-pixel row and sub-pixel column in the camera pixel array 176 is determined, from which axis-orientation of the finger may be assumed. In the camera image plane 176 the axis is a projection of the actual axis of the fingertip in three-dimensional hover zone 130. The three-dimension estimation of axes is produced by intersecting corresponding rays from the other camera, as described later herein. When multiple fingers are involved in a gesture, the same procedure applies to the tip of all visible fingers. The result is that the two-dimensional camera-captured images are rapidly and intelligently examined by signal processor system 60 (an/or 60' and/or 60") to identify skeletal gesture information. This information is used to reconstruct (x,y,z) three-dimensional locations of the relatively few, e.g., perhaps less than a dozen, landmark points, e.g., points A, B, C, D, E, F in FIG. 3A, used to define a user gesture. In general, sub-pixel tip location of the user object in one camera image plane 176 provides necessary but insufficient information to locate the actual location of the user object 110 in real world coordinates. However, similar user object information is acquired substantially simultaneously from the other camera, and together with a priori knowledge of camera calibration information actual location of the user object can be estimated.

During glasses device 30 run-time, the stored calibration and registration information for cameras 55L, 55R can be used for many purposes. Once cameras 55L, 55R, etc. are registered with respect to each other to a common global system, information from the cameras regarding the objects in the same global system can be correlated. For instance, a landmark, perhaps right forefinger tip C in FIG. 3A, imaged by camera 55L can be said to lie in an epipolar line from another camera, 55R. Alternatively, if the landmark, here C, for forefinger tip object 120 is detected in the image planes of at least two cameras, e.g., 55L, 55R, the corresponding backward projection rays can be intersected to determine the three-dimensional position of the landmark in the global world coordinate system $(x_w, y_w, z_w)$; see FIG. 6A.

Typically dense stereoscopically acquired depth calculations are carried out using the sum of squared differences (SSD) method in which a window (or kernel) having a width and a height is assumed. As shown in FIGS. 4A-B, 5, 6A-6C, each camera (55R, 55L, etc.) captures on the camera's respective image plane 176R, 176L an image of an object, e.g., target object 110 in hover zone 130. If each camera images at least part of the same object, the object will appear on each image plane. Relative shift in location on the two image planes of a commonly imaged object is termed disparity, which disparity diminishes as the distance from the camera to the object increases. In SSD methodology, the kernel or window width may be as large as the maximum disparity between two corresponding object image points. The window height may be as large as what calibration tolerance for camera device 40 dictates, perhaps 10 pixels. Assume cameras 55R, 55L have a spaced-apart baseline BL=6 cm (see FIG. 2A, FIG. 3A), and a lens 170 focal length of 1.6 mm. If glasses device 30 had to compute z-depth ranging from about 12 cm to infinity, then maximum disparity size for two corresponding points in each image would be about 0.8 mm, i.e., (1.6 mm)·(6 cm)/(12 cm) or 0.8 mm. If pixel density or pitch on array 94 is 2 μm, then the number of pixels to be analyzed for possible correspondence matches may be up to 400 pixels. Assuming a kernel height of 10 pixels, brute force calculations for 10·400 pixels over each pixel in the first and second images acquired by cameras 55L, 55R respectively yields 1280·720·10·400, or more than 3 billion SSD calculations per frame of optical image. But in practice the most distant hand gesture to be imaged by glasses device 30 would be perhaps 1 m distant, i.e., an arm's length, and the range of z-depth would be on the order of a few cm to perhaps about 1 m. However producing a cloud of three-dimensional data even for reduced range would still represent a substantially huge number of calculations. Performing such large computation in real-time would require substantial processing overhead including operating power, and would yield latency, to the detriment of glasses device 30 response time. However dense cloud processing techniques might be employed if suitably rapid dense stereo calculations could be carried out to ensure spontaneity of user gesture recognition.

In the present invention, glasses device system 40 includes a signal processing system 60 that avoids having to cope with such large amounts of data by intelligently identifying a relatively few so-called relevant landmark points in two-dimensional camera-acquired image data. Three-dimensional reconstruction of locations of these relatively few points is undertaken, with no reconstruction being taken for all data points. The culling out of unnecessary data points reduces three-dimensional reconstruction very substantially, eliminating perhaps 99.9% of the data points. Preferably application of justified epipolar geometry and image rectification techniques during signal processing substantially reduce time and latency needed to arrive at a final, very sparse, set of landmark points used to identify user gestures. Such techniques promote rapid real-time performance for overall device 10, according to embodiments of the present invention.

In operation, data processing within glasses system 40 seeks to rapidly extract a relatively few relevant (x,y,z) landmark points from (x,y) data obtained by acquisition system 50, without having to extract a lot of unnecessary (x,y,z) data. Typically less than one-hundred and preferably only a dozen or so (x,y,z) landmark points suffice, and the time-consuming and error-prone task of removing background information from all acquired imagery need not be undertaken. This is to be contrasted with the prior art's necessity to process many, many hundreds of thousands of image points. According to the present invention, two-dimensional image recognition is carried out on the acquired (x,y) image data to locate landmarks associated with the imaged object(s) in so-called image coordinates. These coordinates can be pixel or sub-pixel $p_{(x,y)}$ addresses in each camera's sensor array 176 for objects of interest, e.g., fingertips, hand centroid, medial axis of fingers, etc. Processing system software preferably labels each landmark using an identification rule. Each camera's a priori determined and stored lens distortion and other camera intrinsic parameters are used to find the undistorted image coordinates of the landmarks on a per camera basis. A likelihood priority order of the correspondence between the landmarks across different cameras is then employed, e.g., a given index fingertip acquired in this image from camera 55R is most likely the same as the index fingertip in the other image acquired by camera 55L, etc. Advantageous use of so-called epipolar scan lines and image rectification assists in rapidly disambiguating potential landmark points, to quickly find the best matches. Processing efficiency is further promoted by balancing processing loads between signal processing system 60, 60', 60". If signal processor 60 carries the entire processing load it is preferred to constrain processing overhead to less than about 10% to about 25% of processor utilization, perhaps employing parallel processors. So doing reduces run-time computation load for device and helps ensure a desired camera acquisition frame rate. The software algorithms preferably used by embodiments of the present invention will now be described generally at a logical level and with reference to some of the many opportunities for potential parallelism of algorithm steps (or blocks).

Using the stored calibration information, the (x,y,z) coordinates for each landmark are determined with respect to coordinates of each camera, subject to a scale factor. The scale factor represents the assumption that the real-world position of a landmark in image coordinates (i.e. a pixel or sub-pixel address) is along a given light ray associated with that pixel or sub-pixel, subject to some error in the image analysis and calibration process.

Next, three-dimensional reconstruction of corresponding landmarks across the cameras is carried out using at least one minimization algorithm. Essentially, the task is to find the three-dimensional intersection of at least two rays in three dimensions. The first of the two rays is from a landmark point to the pixel sensor on camera 55L, and the second ray is from the same landmark point (but as viewed from the second view point) to the pixel sensor on camera 55R. In practice various error factors cause the two rays to come very close to each other near the landmark point, but not to intersect perfectly mathematically. Accordingly, embodiments of the present invention use a known minimization algorithm to find the midpoint of two closest points in the two rays corresponding to the same (or substantially nearly the same) landmark.

Note that advantageously such reconstructions involve a relatively few landmark points, typically less than 1% of what must be processed from the very large three-dimensional cloud data set acquired by prior art structured light systems, TOF systems, full stereo processing systems, and the like. In the present invention, correspondences of unlikely pairs are cleaned-up preferably based on heuristics or information from the past correspondences or tracking predictions, e.g., using a filter based upon probabilities, perhaps using known Markov prediction or Bayesian networks methods. The algorithm then preferably performs smoothing and tracking in the world coordinates, and user interface events including gestures are produced with location information with respect to $(x_w, y_w, z_w)$ common world coordinates Various compression methods may be used for cameras 55L, 55R having higher pixel density sensor arrays 176 (FIG. 4A). One can use MPEG or some other form of image compression to substantially reduce data size and associated required bandwidth, but with an associated cost and complexity penalty of requiring an MPEG coder and decoder. Thus, semantic compression preferably sends onward only segments of the acquired image that are of interest for the relevant application. A semantic compression is one that understands the image, e.g., if the object is known to be a hand, the processor can reduce the data to be transferred to only those pixel addresses representing a few fingertip points, or other key landmarks for a gesture application. In an extreme case, it can suffice to send on only the relatively sparse data representing location (i.e., relevant $p_{(x,y)}$ pixel row/col addresses in sensor pixel array 176, FIG. 4A) of one or more pixels that represent the tip of a single (or multiple) pointer object(s). In other words, some form of image segmentation logic in the camera module can substantially reduce the amount of data flow because only data from camera array pixels containing interesting scene regions, e.g., landmark data or edges, need be transferred. In another aggressive compression model, the processor may reduce the volume of data transfer by reducing the image to a few pixels representing a few landmark points, perhaps the contour of a user's hand, and their properties, or even perform some rudimentary gesture processing. An example of a relatively few landmark points might be fingertip points relating to the tip of at least one user finger or other object, used in a gesture application.

Segmentation involves labeling pixels that are part of the acquired image foreground and presumably the user of interest, which is to say that segmentation seeks to find these key parts in the camera-acquired images. For instance, for a user hand object, segmentation labels pixels that are part of the hand and wrist, palm and fingers. If two hands are imaged, segmentation can identify up to ten finger parts, e.g., landmarks, and the result of the segmentation process from each camera is thus an image that has unique labels for each finger, palm and wrist, e.g., an image of the relevant landmarks A, B, C, D, E, F in FIGS. 3A-3C. Such image of the relevant landmarks can be represented more compactly and thus require less bandwidth and less memory storage than if the entire frame of acquired imagery were processed and stored. The segmentation algorithm can run in parallel for the image acquired by each camera, and if the camera includes a processor and controller, e.g., 173 in FIG. 4A, each such processor can perform segmentation on each image. Alternatively, signal processor system 60 and/or 60' and/or 60" (see FIG. 5)

can schedule parallel threads to perform the multiple segmentation tasks simultaneously. Segmentation and use of probable landmarks before the three-dimensional data is reconstructed further enable implementation of glasses system 40 using inexpensive, generic and low power consumption components, unlike many prior art approaches.

Image segmentation algorithms are known in the art. Some algorithms make assumptions as to object shapes, e.g., a finger is a cylinder shape that begins with a tip and ends when it joins a wider body of pixels representing the palm of the hand object. If the cameras acquire color information, the algorithm can use color features to assist in segmentation. Other algorithms store hand model data, and then try to match a camera-acquired image of an object to see which stored model provides the best object match. If the model matching is reasonably acceptable, other image parts can be readily determined since they are already identified in the model. From the perspective of camera 55L a finger object 110 can be occluded by the other fingers, yet still be visible to camera 55R because of the differing vantage point. Thus occlusion difficulties can often be overcome because of the multi-camera approach used in the present invention. While true three-dimensional reconstruction will not occur for the occluded object, nonetheless if it is imaged by the second camera its presence and its position relative to the first, non-occluded, object may be inferred.

It is useful to consider FIG. 6A, which further depicts concepts used in defining a global system of coordinates, according to embodiments of the present invention, although an intuitively identifiable coordinate system is not necessary for implementing all types of natural interface applications. However a global system coordinate system is useful and can be defined with respect to a known world point (e.g., a known location on glasses device 30 or clip-on glasses 30'). FIG. 6A depicts the role of geometric properties of a pin-hole camera, i.e., a hypothetically perfect camera, i.e., idealized 55L, 55R, etc. FIG. 6A further depicts a camera image plane 176, and a virtual image plane 176' that define 55L or 55R by coordinate axes (x,y) equivalent to ($x_c$,$y_c$).

Tracking the motion of a gesture requires accurately locating the position of the hand making the gesture in three-dimensions with respect to world coordinates. So doing can be particularly important in tracking dynamic gestures, and gestures that mimic the behavior of a computer mouse. Although the geometric concepts in the following derivation refer to a single camera, the derivation is applicable to any number of cameras, e.g., 55L, 55R.

For ease of understanding, FIG. 6A depicts a user or user object 110 at location L, and also shows the camera sensor array 176 of pixels $p_{(x,y)}$. Although FIG. 6A assumes a camera with an ideal lens model, in practice lenses 170 of actual cameras 55L, 55R often have distortion. In embodiments of the present invention, lens distortion is removed or compensated for, such that the ideal camera model described herein is applicable for the actual camera. In FIG. 6A, camera image plane 176 is represented by a virtual image plane 176' a distance in front of lens 170 equal to the distance from the lens to the actual image plane 176. This construction provides a mathematically equivalent model that avoids image inversion. A single ray (of many rays) within the FOV of the camera sensor array and lens is drawn with a bold line (for ease of understanding) terminating at point L, object 110. It is understood that FIGS. 1-3C depict a plurality of converging rays, of which the bold line in FIG. 6A is but one such ray passing through point L. Each camera, e.g., 55R, will image the landmark in different (sub) pixels of its array, e.g., 176R, depending on its vantage point with respect to the user object of interest. Use of camera calibration and global registration information enables calculating rays emanating from each camera that pass through L. Clearly, the intersection of the rays from at least two cameras defines the location of L in three-dimensional space in the active area. However, in a real (non-ideal) system, the rays do not intersect due to slight offsets resulting from calibration error, the error introduced due to the vantage point of each camera, quantization and detection errors, etc. Nonetheless, a solution can be found that minimizes a cost function (in this case, the closest distance between at least two lines) and produces an estimated three-dimensional point that is close to theoretical intersection point. Such techniques are described by Hartley and Zissermann "Multiple View Geometry in Computer Vision", second edition, Cambridge University Press, March 2004.

Let $$\begin{pmatrix} u_d \\ v_d \end{pmatrix}$$

be the observed pixel coordinate of a landmark on user object 110 as observed within interaction sub-region zone 120 within hover zone 130 by one camera, e.g. 55L. Furthermore, let $$\begin{pmatrix} x_d \\ x_d \end{pmatrix}$$

be the image coordinate of the landmark, let $$\begin{pmatrix} u_n \\ v_n \end{pmatrix}$$

be the undistorted pixel coordinate of the landmark, and let $$\begin{pmatrix} x_n \\ y_n \end{pmatrix}$$

be the undistorted image coordinate of the landmark.

The relationship between $$\begin{pmatrix} u_d \\ v_d \end{pmatrix}$$

and $$\begin{pmatrix} x_d \\ x_d \end{pmatrix}$$

is obtained from:

$$u_d = u_0 + \alpha x_d + c y_d$$

$$v_d = v_0 + \beta y_d$$

where $\alpha$ and $\beta$ are scale factors of the camera sensor (i.e., pixel dimensions), and c is the camera pixel array skewness, where in an ideal sensor, $\alpha = \beta$ and $c = 0$. The parameters $u_0$ and $v_0$ are the center of the image, and parameters $\alpha$, $\beta$, c, $u_0$ and $v_0$ are obtained from the calibration step of each camera.

Cameras 55L, 55R as used with glasses device 30 (or clip-on glasses 30') may have relatively large FOVs such that distortion effects cannot be ignored and lens correction is called for. Camera lens distortion has a dominant radial factor and a less dominant tangential factor. The more dominant radial distortion may be modeled as follows:

$$x_d = x_n + x_n[k_1 r_n^2 + k_2 r_n^4 + \ldots]$$
$$y_d = y_n + y_n[k_1 r_n^2 + k_2 r_n^4 + \ldots]$$

where $$r_n^2 = x_n^2 + y_n^2.$$

Parameters $k_1, k_2, \ldots$ are lens distortion parameters and are estimated from the calibration step for each camera module. The solution method for $$\begin{pmatrix} x_n \\ x_n \end{pmatrix}$$

may include iterative or other numerical methods that are available in the literature.

Let $$\begin{Bmatrix} x_c \\ y_c \\ z_c \end{Bmatrix}$$

be the (undistorted) coordinate of a landmark in the camera coordinate. Let $$\begin{Bmatrix} x_w \\ y_w \\ z_w \end{Bmatrix}$$

be the coordinate of the landmark in world coordinates system $$\begin{Bmatrix} X_w \\ Y_w \\ Z_w \end{Bmatrix}.$$

FIG. 6A depicts camera coordinates ($X_c, Y_c, Z_c$) and world coordinates ($X_w, Y_w, Z_w$) for a single camera, e.g., 55L or 55R. Similarly, each other camera has its own camera coordinates but shares the same world coordinate system, which is not shown in FIG. 6A.

Let f be the focal length of the camera sensor lens 170. Focal length f can be obtained from the lens specification or from the camera calibration process. The camera model yields the following projection (or three-dimensional to two-dimensional mapping) denoted by P in matrix form:

$$x_c = \frac{z_c}{f} \times x_n$$
$$y_c = \frac{z_c}{f} \times y_n$$

In other words, $$\begin{pmatrix} x_n \\ y_n \end{pmatrix}$$

is the projection of a landmark point $$L = \begin{Bmatrix} x_c \\ y_c \\ z_c \end{Bmatrix}$$

in the image plane after unwrapping the effect of distortion. Of course, many points along the ray that pass through point L are also projected to the same image point $$\begin{pmatrix} x_n \\ y_n \end{pmatrix},$$

Resolving this particular landmark in three-dimensional space requires information about the same (or nearby) point, from the other camera(s). But before one can use the additional information, it is In information, it is necessary to calculate coordinates of L in a common world coordinates because camera coordinates do not present accessible reference information to the application.

Let the L=

$$L = \begin{Bmatrix} x_w \\ y_w \\ z_w \end{Bmatrix}$$

be the common world coordinate of point L in a common world coordinate system $$\begin{Bmatrix} X_w \\ Y_w \\ Z_w \end{Bmatrix}.$$

The transformation from camera coordinates to world coordinates is given by:

$$\begin{Bmatrix} x_w \\ y_w \\ z_w \end{Bmatrix} = R \begin{Bmatrix} x_c \\ y_c \\ z_c \end{Bmatrix} + T$$

where R (3×3) and T (3×1) are rotation and transformation matrices, respectively. The extrinsic parameters R and T are obtained during camera calibration when cameras are registered to the same common global coordinate system. In addition to projection P, these extrinsic parameters represent the $P_1, R_1, T_1$, and $P_2, R_2, T_2$, transformation symbols depicted in FIG. 4B and FIG. 5

The issue of correspondence must also be addressed. When a real world object, e.g., user object 110, is imaged substantially simultaneously by multiple optically similar cameras, e.g., 55L, 55R, etc., different parts of the same user object map to different camera array pixels depending upon relative orientation and distance of the cameras with respect to each other. Solving the image correspondence means determining where the same object is mapped in two or more images from the same camera (during user object motion) or from different cameras. Determining object correspondences is important to correctly determine the three-dimensional position of an object using the geometrical properties of the cameras. It is well-known in the art that unless correspondence is established correctly, three-dimensional reconstruction can produce ambiguous results. Camera calibration information and information from landmark identifiers preferably is used to disambiguate the correspondence problem.

Even if the same object is being imaged by all cameras, the image imprint of the object in each camera can be very different because the cameras view the object from different vantage points and from different distances. For instance, a user finger can fill the frame of a nearby camera but only occupy a small part of the frame of a distant camera, admittedly a rare case when the cameras are spaced relatively close together. However when the user object is a comfortable distance from each camera, perhaps about 30 cm to about 80 cm, occlusion difficulties are lessened and substantial benefits can be obtained from the multiple views that are obtained to recognize landmark(s). If the user object is very far from the cameras, occlusion artifacts are less of an issue.

Preferably cameras 55L, 55R, etc. will have been calibrated (and preferably calibration data stored in the camera's internal memory 175' (FIG. 4A) and modeled to have pinhole camera characteristics. Such characteristics enable epipolar geometric analysis, which facilitates more rapid disambiguation among potential landmark points during three-dimensional reconstruction. Preferably image rectification is used to make epipolar lines parallel to an axis of the camera image planes, to better facilitate finding correspondence between landmark image points acquired by the two cameras. As will be described herein with respect to FIG. 6B-FIG. 6G, software within the device processor system looks at epipolar lines drawn through landmark points in the first image plane to find candidate landmark points on or adjacent the epipolar line in the second image plane. Preferably only such candidate landmark points are deemed disambiguated and receive three-dimensional processing; the large number of other points are simply discarded without further processing. Consequently processing overhead is substantially reduced, as is latency time. The reduction in three-dimensional processing is rapidly reduced by greater than 99%, and frequently greater than 99.99%, thanks in part to application of epipolar geometry and image rectification.

Figure 6B:
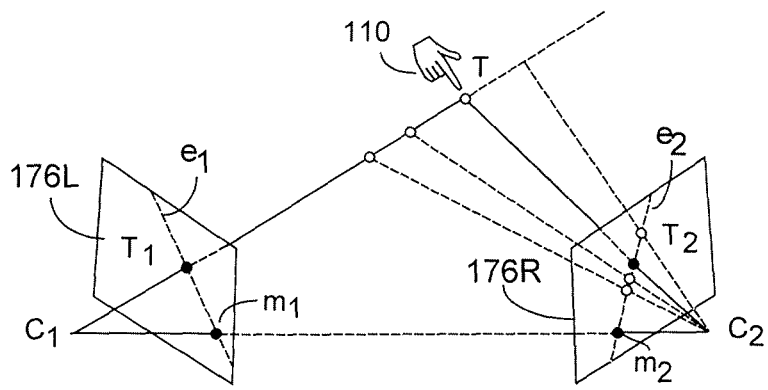
Figure 6C:
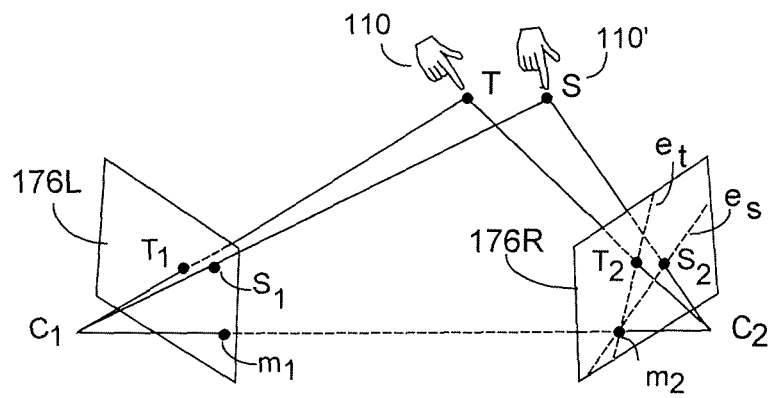

FIG. 6B and FIG. 6C depict the application of epipolar line geometric properties of glasses system 40 and cameras 55L, 55R according to embodiments of the present invention. These embodiments promote low processing requirements and improve latency times for overall glasses system 40 by recognizing and taking advantage of these epipolar properties to enhance disambiguation between multiple potential object landmarks during three-dimensional reconstruction. Epipolar geometry is typically defined by assuming a pinhole camera model. As noted, cameras 55L, 55R preferably are calibrated and registered with respect to each other.

Registration maps the lens coordinate system of cameras 55L, 55R, etc. to a common coordinate system, e.g., a center region of the frame of glasses device 20, perhaps the center of baseline distance BL in FIG. 2A, FIG. 3A. The associated calibration information enables each camera to be converted operationally so as to satisfy the characteristics of a pinhole camera. So doing entails determining the distortion model for cameras 55L, 55R, un-distorting camera-acquired images using camera intrinsic parameter values. Of course if camera (s) 55L, 55R have exceedingly good lenses 170, distortion may be nil, in which case un-distorting method steps may be dispensed with. This information is saved, e.g., in memory 62 (see FIG. 5) or in in-camera non-volatile memory 175' (see FIG. 4A), for use during glasses system 40 run-time operation. Once cameras 55L, 55R can be modeled as pinhole cameras and registered to each other, the properties of epipolar geometry can be advantageously employed to reduce processing search time to find landmarks (e.g., A, B, C, D, etc., see FIGS. 3A-3C) in the imagery acquired by glasses device 30.

The present invention seeks to recognize the user gesture and certain other gesture properties that are useful to implement a natural gesture-based user interface. Gesture recognition is a well-studied topic in the art, and aspects of the present invention provide a platform to implement gesture recognition algorithms. An exemplary result of a gesture recognition algorithm (e.g., perhaps routine 64-2 stored in memory 62, FIG. 5) is a series of landmark points, e.g., fingertips, digits, palm centroid, wrist centroid, that define the configuration of the gestures. As noted, in FIG. 3A-FIG. 3C, exemplary landmarks are denoted as circles on the glasses-facing surface of the user, e.g., A, B, C, D, E, etc. Cameras 55L, 55R capture images of user object 110 within interaction sub-region zone 120, within larger hover zone 130. The landmarks are identified by their (x,y) pixel locations in the image plane 176 of each camera (see FIG. 4A, FIG. 5). Just as with a finger, not all landmarks of a given gesture can be visible to all cameras. However, through aggregating this information and establishing correspondence between them across all the cameras a very well picture of the user intention can be deduced. Understandably, generating landmark information using in-camera processor-controller 174 and sending on for further processing only those relatively few data points can substantially reduce throughput of data. In-camera processing of image data can reduce the magnitude of data needed to represent landmark data from hundreds of kilobytes, to a few hundred bytes or less. So doing enhances real-time throughput of glasses system 40. However embodiments of the present invention may off-load some processing tasks wirelessly via I/O system 90, e.g., off-glasses network server(s) 100 (FIG. 1), or to a module 160' that the user may keep in a pocket or purse (FIG. 2B). Such embodiments reduce weight, form factor, and power consumption of glasses system 40 and are useful in light weight systems, perhaps where systems comprising the present invention are in the form of a clip-on pair of glasses that fit over normal prescription glasses, typically to provide sun glass filtering.

Three-dimensional reconstruction of landmarks including resolving a particular landmark in three-dimensional space requires information about the same (or nearby) point from multiple cameras. Acquiring multiple views of a user object can be advantageous in dealing with problems of occlusion. Occlusion occurs when a segment of the object of interest becomes hidden behind another object from the vantage point of one or more cameras. If the object is hidden from both cameras, only higher level reasoning like the tracking over a number of frames can deduce the location of the object while it is hidden from both cameras. However, when a segment of an object of interest is hidden from only one camera, the image captured by the other camera can assist in producing useful information about the occluded area. In such instance, the system looks at the neighboring area that is visible to both cameras. This capability of multi-camera systems is very advantageous compared to what little can be done by prior art systems using a single view active light capture.

Referring to FIG. 6B, let $C_1$ and $C_2$ denote the center of optical projection for cameras 55L, 55R respectively, where user object fingertip 110 is a potential object landmark. Each camera 55L, 55R images user fingertip 110 from that camera's position. The fingertip object projects onto image plane 176L (of camera 55L) at location $T_1$, and projects onto image plane 176R (of camera 55R) at location $T_2$. The intersection of light rays $T_1$,T and $T_2$,T defines the (x,y,z) location of T in three-dimensional real space. The intersection of line $C_1$-$C_2$ with image plane 176L is denoted $m_1$, and the intersection of line $C_1$-$C_2$ with image plane 176R is denoted $m_2$. $C_1$, $C_2$, and T define a plane that intersects with image plane 176L to define an epipolar line $e_1$. The projection of any point in light ray $T_1$-T maps to point T1 in image plane 176L. The same plane defined by points $C_1$, $C_2$, and T intersects with image plane 176R to define an epipolar line $e_2$. The projection of any point in light ray $T_1$-T maps to epipolar line $e_2$.

This observation is significant because finding the image of any candidate point along ray $T_1$-T can be simplified to looking for candidate points along epipolar line $e_2$, rather than searching the entire image for candidate points. At this juncture, at step 440 in FIG. 9 a limited number of potential three-dimensional candidate landmark points under consideration, perhaps on the order of 100 points from one image plane and perhaps 150 points from the other image plane. Perhaps 80 of these 250 points are found on both image planes. Identifying corresponding points could be carried out by a time-consuming process of comparing every candidate point from one image plane to every candidate point on the other image plane, a calculation involving perhaps 100·150 or 15,000 steps for the example given. More preferably, glasses device 30 (or clip-on device 30') recognizes that from the 100 candidate points in the first image plane, 100 epipolar lines can be defined and projected onto the second image plane. Consequently it suffices to simply look for corresponding candidate points on the second image plane that lie upon these epipolar lines, disregarding candidate points on the second image plane that lie elsewhere. In practice one can define "fat" epipolar lines to account for tolerances associated with camera calibration, e.g., relevant candidate points in the second image plane might occur very close to rather than directly on theoretical epipolar lines from points in the first image plane.

FIG. 6C is similar to FIG. 6B, and demonstrates application of epipolar constructs, especially to disambiguate between multiple landmark user objects 110 (T), 40-1' (S). Camera 55L images fingertip objects 110, 110', which appear at positions $T_1$, $S_1$ on associated camera image plane 176L. Substantially simultaneously, camera 55R images the same two user objects, which appear at positions $T_2$, $S_2$ on associated camera image plane 176R. Referring to image plane 176L (associated with camera 55L), the two images landmarks $T_t$ and $S_1$ preferably are identified using image analysis algorithm(s) 64-n stored in memory 62 as described herein with respect to FIG. 5. Assume shape analysis is inconclusive, which implies uncertainty as to whether $T_2$ or $S_2$ are images of point T in plane 176R. Preferably disambiguation between $T_2$ and $S_2$ involves defining an epipolar line $e_t$ in image plane 176R, and determining whether $T_2$ or $S_2$ lie upon this line. Per FIG. 6C, $T_2$ lies upon epipolar line $e_t$ and $S_2$ does not. Thus one can rapidly conclude that $T_2$ corresponds to $T_1$ and both represent object 110, to the exclusion of potential candidate $S_2$ and thus other object 110'. Once this correct correspondence is established, the present invention can determine the three-dimensional (x,y,z) coordinate position for object 110 (T) and intelligently knows not to waste time and resources calculating a coordinate position for object 110'.

Note in FIG. 6B and FIG. 6C that the epipolar lines were at arbitrary angles with respect to axes of the image planes. Traversing these lines to resolve correspondences is complicated and costly. Traversing would be simplified if the images were rectified such that such a pair of corresponding epipolar lines became collinear and parallel to each other alone one of the image axes. Image rectification methods are known in the art, e.g., see "*Introductory Techniques for 3D Computer Vision*" by E. Trucco and A. Verri, 1998.

FIG. 6D and FIG. 6E depict two user hand objects, each having at least one projecting finger. In FIG. 6D, the hand and finger images were captured by left camera 55L, and the forefingers are denoted 110'L and 110L. The images in FIG. 6E were captured by right camera 55R and the forefingers are denoted 110'R and 110R. FIG. 6F and FIG. 6G represent the rectified images, respectively, of FIG. 6D and FIG. 6E. Note that the captured images differ somewhat, which is not unusual given that each camera captures images from its own unique viewpoint.

In the rectified images depicted in FIG. 6F and FIG. 6G, the epipolar lines are collinear and parallel to the horizontal image plane axes. Transformation parameters used to rectify the images preferably are obtained from the intrinsic and extrinsic parameters for the cameras, which are obtained generally during factory calibration of the cameras.

Thus epipolar lines, e.g., $ep_1$, $ep_2$, $ep_3$, etc. are shown horizontally, parallel to display monitor scan lines in FIG. 6F and FIG. 6G. Looking at image point 110L (acquired by camera 55L) in FIG. 6F, it is easy to discern that correspondence exists with point 110R but not with point 110'R (which points were acquired by camera 55R) in FIG. 6G. This is because epipolar line $ep_1$, passing through point 110L, also passes through point 110R, but does not pass through point 110'R. Furthermore, there is less chance of erroneously establishing correspondence between fingertip 110'L and fingertip 110R. This is because image point 110'L lies on epipolar line $ep_2$ whereas image point 110R lies on a different epipolar line, $ep_1$. Rectified images in FIGS. 6F and 6G may be reduced at their edges as shown by boundaries 200L and 200R because not all image segments acquired by left camera 55L have corresponding image segments acquired by right camera 55R. The images can be constrained to lie within a rectified rectangular image boundary of one camera by defining bounding rectangle 202L and 202R.

Thus, recognizing that cameras 55L, 55R, etc. can be modeled as pinhole cameras warrants application of epipolar geometric analysis and image rectification to camera acquired data within glasses device 30. Such analysis enables system image processing computation and recognition of landmark points to occur very rapidly and reliably, using relatively inexpensive components. Further such analysis is one of the factors contributing to reduction of overall system latency times, and enhances real-time performance of gesture detection and recognition by glasses device 30.

FIG. 7A-FIG. 7K depict latency, as improved by embodiments of the present invention. In a natural user interface application excessive processing latency can produce an unnaturally long time lag between the user's gesture or other interaction, and the time when a meaningful response is displayed on the system monitor or is otherwise manifested. In these figures, vertical tic marks along the horizontal line represent units of time on the order of perhaps 33.3 ms, e.g., exemplary time required to acquire a frame of data from the system cameras. It is assumed in these figures that similar tasks takes approximately similar times to carry out, and that transmission delays are subsumed in each block or epoch of time.

FIG. 7A-FIG. 7D show the true location position of a user target object, here a hand, as a function of time. Thus the hand object is shown moving at equally per unit time interval (e.g., constant speed) and is shown on a system two-dimensional monitor display with zero latency. In FIG. 7A-FIG. 7K, the actual location of the hand object is drawn with bold line, to distinguish from other representations of the hand object. FIGS. 7E-7H show the approximate length of time required by prior art algorithm methods to carry out given tasks, in terms of acquiring imagery, creating a three-dimensional data cloud, carrying out steps during detection middleware, and ultimately displaying the location of the detected hand on display system 80 or an off-glasses display 150. In FIG. 7E-FIG. 7H, a unit time corresponds roughly to carrying out each of these prior art processing steps.

FIG. 7E represents raw data capture, according to the prior art, a step that may involve multiple sub-captures, leading to a series of raw data used later to build a three-dimensional map of the imaged scene. Note that this prior art step shown in FIG. 7E does not produce three-dimensional data, but merely captures raw data that must be processed in the following step to produce a three-dimensional cloud. Assume then that this capture of raw data obtains an image of the hand object when the hand object is at the first time tic mark (see FIG. 7A). FIG. 7F represents creation of a data cloud per the prior art, a task depicted as requiring about one unit of time, during which time interval the hand object has moved to the second time tic mark. In FIG. 7G the three-dimensional data cloud has been passed to prior art detection middleware software. This software carries out image processing of depth data to identify the hand object, and presumably also to find the fingertip. During this time, the hand object has actually moved to the third time tic mark.

In FIG. 7H, the prior art processing pipeline displays the hand object, but at the first tic mark location where it was when the raw data was captured (see FIG. 7E). The time difference between the current true location of the hand object (fourth time tic mark) and what is produced and displayed from the processing pipeline (first time tic mark) is a measure of the latency of this prior art method. In this example the latency is three time units. If each time unit is say 33.3 ms, then the latency or time lag here is about 100 ms.

Referring now to FIG. 7I-FIG. 7J, a similar progression of events is depicted for embodiments of the present invention. FIG. 7I depicts substantially simultaneous image capture by cameras 55L, 55R, see FIG. 9, step 400. As such, image capture does not contribute to latency for glasses device 30. FIG. 7J represents middleware image processing (see FIG. 9, step 410 to step 470), identification of a relatively few key landmark points, and rapid three-dimensional reconstruction location of only those key landmark points. Three-dimensional reconstruction is quite fast as only a dozen to perhaps one hundred points require reconstruction. During this time interval the hand object has moved to the third time tic mark (shown by the bold line hand, and by FIG. 7C). Assuming a similar time required to display the image (first time tic mark) as required in the prior art, latency is seen to be two time units, or perhaps 66.6 ms, for the assumed frame rate. Thus, latency for glasses device 30 as described herein is at least about 33.3% better than in the prior art methods exemplified by FIG. 7H. Thus, not only do embodiments of the present invention implement glasses device 30 with inexpensive, small, lightweight generic cameras 55L, 55R, etc. but faster throughput time is achieved. The low latency results in a more realistic natural user interface experience.

Figure 8A:
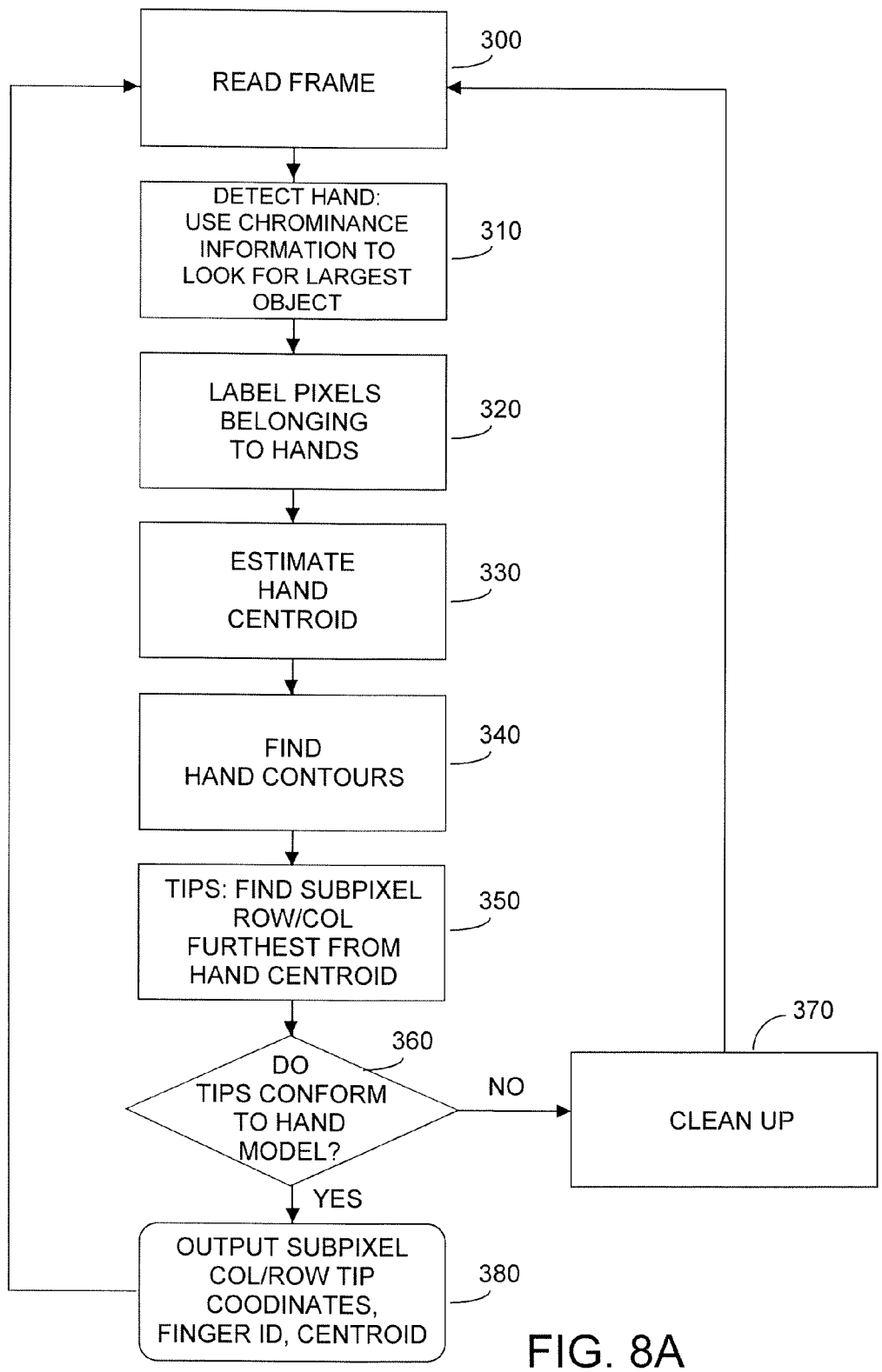
FIG. 8A is a flow chart depicting exemplary method steps in detecting a fingertip landmark coordinates, according to embodiments of the present invention.

Turning now to FIG. 8A, an exemplary flow chart for detection of a user's fingertips using the image from a single camera is depicted. The process steps depicted in FIG. 8A (and FIG. 8B, described following) are preferably carried out within signal processor system 60 (and/or 60' and/or 60") as shown in FIG. 5. While FIG. 8A describes detection of fingertip landmarks, a similar method flow applies to detection of other landmarks, perhaps user's arms, head, face, etc.

In FIG. 8A, at method step 300, camera frame information is read into a buffer in processor memory, e.g., memory 62 in FIG. 5. If camera 55L can acquire RGB information, hand color can be used as an identifying clue to help recognize that the user object is a hand, although hand color can change under different ambient lighting conditions. Therefore, step 310 uses chrominance ("UV") information, which is independent of luminance, to detect pixels matching hand color. Other clues such size and shape of the object can provide additional information for algorithm 64-n (FIG. 5) to identify the pixels that are part of the user's hand. In step 320, pixels that are part of the hand are labeled after determining yes/no whether the pixel appears to belong to the hand image. At step 330, the hand centroid is estimated using the mass of pixels labeled as part of the hand at previous step 320. At step 340, the hand contour is determined. At step 350 data in the rows and columns in the camera pixel array are examined to determine the fingertips as being the data points farthest away from the hand centroid, determined at step 320. At step 360 a yes/no decision is made by algorithm 64-n (FIG. 5), to verify that the resulting map of fingertip pixels indeed conform to the hand model. For instance, the count of the fingers in a single hand must not exceed five. If the fingertip arrangement does not conform to a hand model, step 370 performs a cleanup and returns to looking at the next frame at method step 300. Otherwise, if the fingertip data appears to conform to the hand model, the method progresses and step 380 outputs the location in the camera pixel array, preferably providing sub-pixel column/row array location, of the fingertip in the image plane. Step 380 also provides identification for each finger (e.g., thumb, index, middle, ring, little). Step 380 can also use other information in the finger orientation, i.e., are the finger axes straight or bent, etc., or being bent, e.g., motion velocity in a user gesture.

Figure 8B:
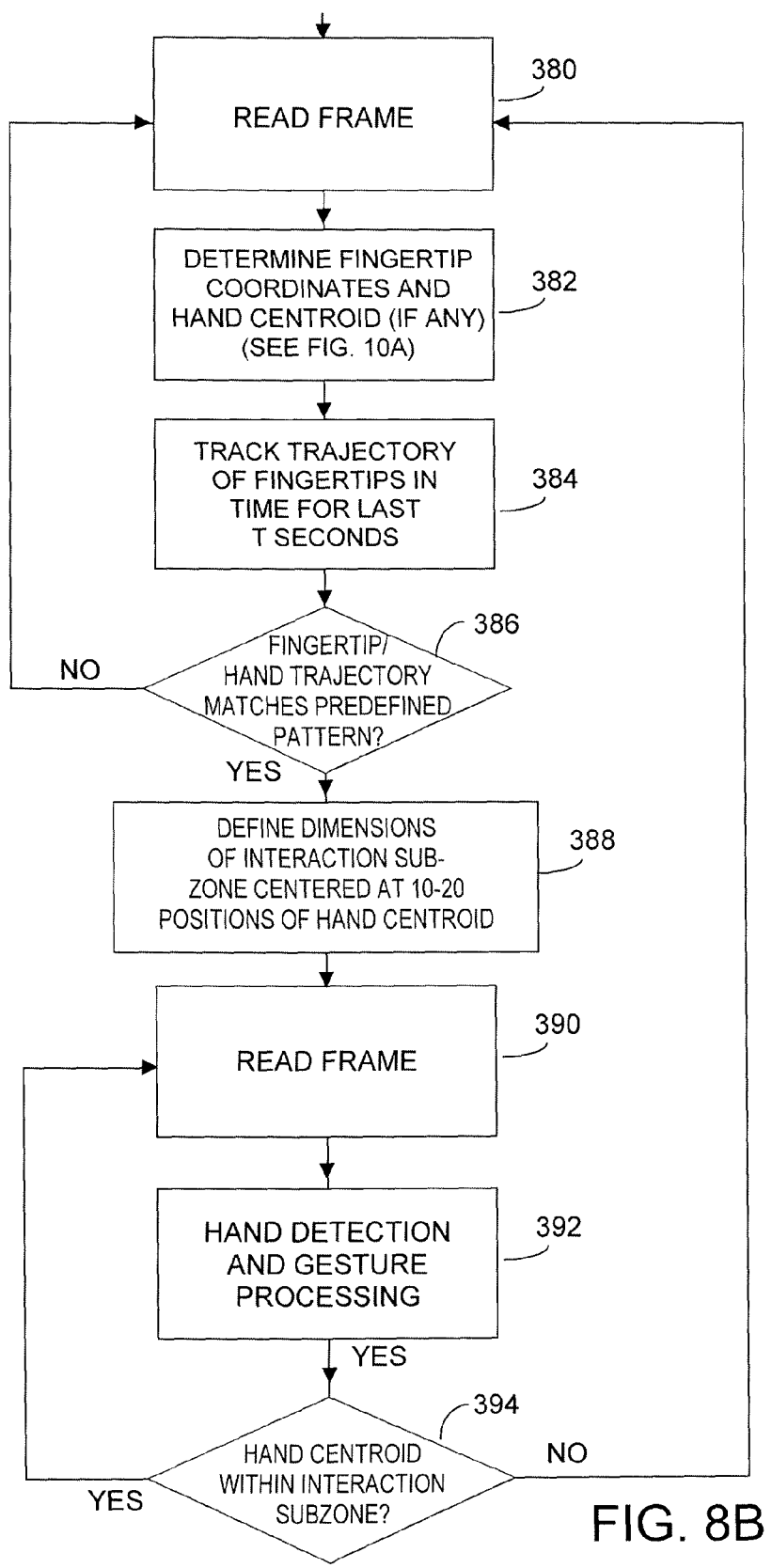
FIG. 8B is a flow chart depicting exemplary method steps in detecting a gestures and in sizing an appropriate interaction sub-region zone, according to embodiments of the present invention.

Turning now to FIG. 8B, signal processor system 60 (and/or 60' and/or 60") executes software 64-n stored in memory 62 (see FIG. 5) to carry out the steps shown, in detecting gestures and sizing an appropriate subzone, according to embodiments of the present invention. While FIG. 8A described detection of fingertip landmarks, the flowchart in FIG. 8B preferably uses coordinates of the hand landmarks (e.g. centroid and fingertips) as will now be described.

In FIG. 8B, at method step 380, camera frame information from cameras 55L, 55R, etc. is read into a buffer in processor memory, e.g., memory 62 in FIG. 5. This step is similar to step 300 in FIG. 8A. In method step 382, the software performs essentially the steps of FIG. 8A to determine the fingertip coordinates and hand centroid; see also step 380 of FIG. 8A. In FIG. 8B, in step 384, a tracking algorithm, e.g., 64-2 stored in memory 62 (FIG. 5) follows the trajectory of the user's fingertips and hand centroid in time for the last T seconds where T can vary between about 3 seconds to about 6 seconds, ignoring earlier in time data. At method step 386, the trajectory of the user's hand is compared to a previously defined shape, preferably stored in memory 62 (see FIG. 5). For example do the user's fingertips appear to be following the user's hand. If no match appears present, the method branches back to step 380 to repeat the process. If step 386 appears to find a match, the routine continues to step 388 in which the software defines an interaction sub-zone centered at the centroid of the user's hand, preferably averaged over the same last T seconds. This information is provided to method step 390 and the software enters hand detection and gesture processing mode at step 392. In the same step 392, commands commensurate with detected gestures are sent to video generation system 70 (and/or 70' and/or 70"), where by way of example imagery 85 on display 80 and/or imagery displayed on an external to glasses device such as display monitor 150 may be altered commensurate with the user gesture. In method step 394, a check is made to ensure that the user hand (or user-object) 110 is substantially within interaction sub-region zone 120. If it is, the process continues by returning to step 390 to read more frames of optical data. Otherwise, the gesture processing mode is terminated and the software enters a mode looking for the user to define perhaps a new interaction subzone.

Figure 9:
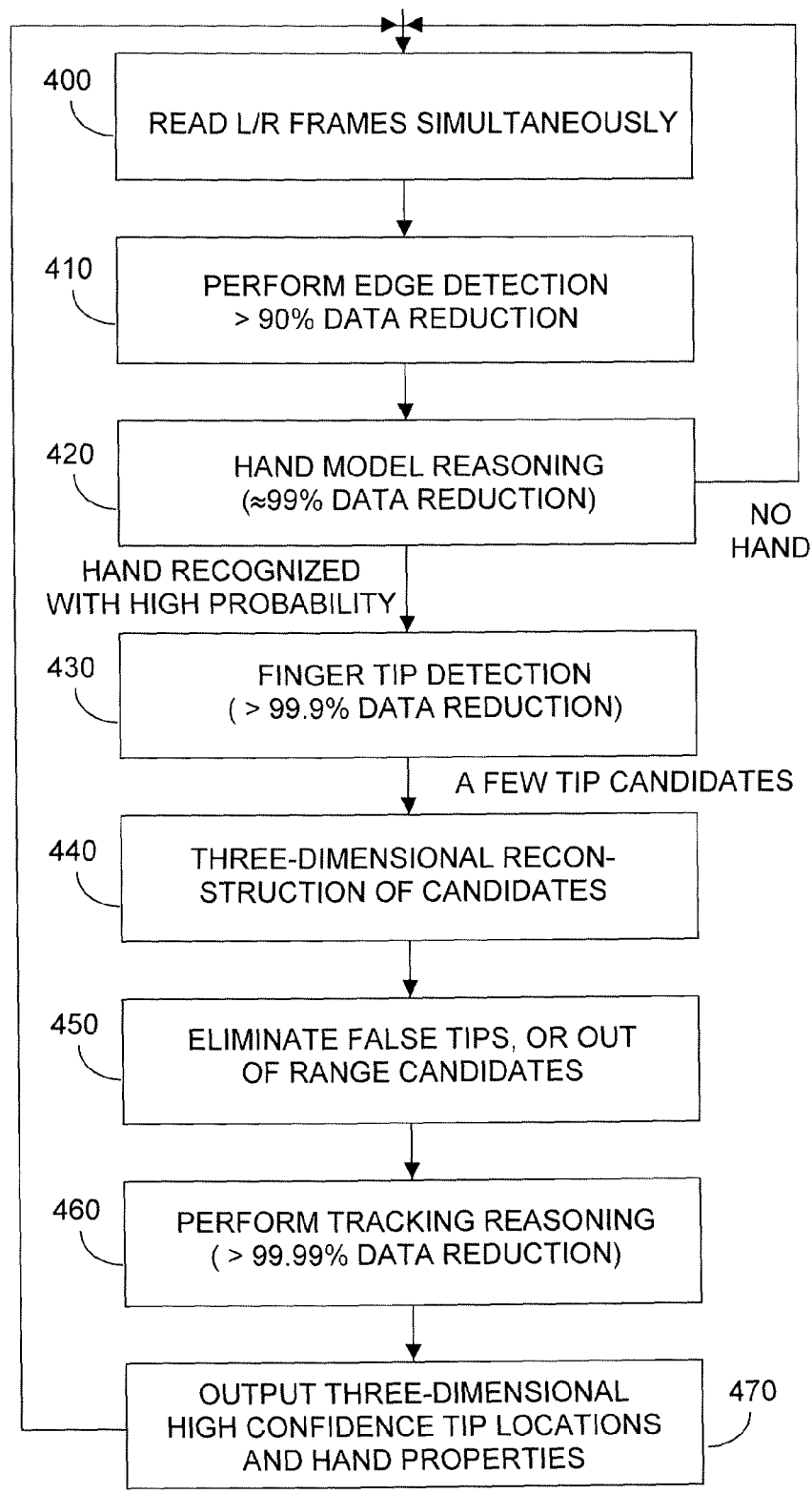
FIG. 9 is a flow chart depicting exemplary method steps for detecting a fingertip landmark using epipolar geometric analysis including image rectification, according to embodiments of the present invention.

FIG. 9 is a flow chart depicting exemplary method steps for detecting a fingertip landmark using epipolar geometric analysis including image rectification, according to embodiments of the present invention. Method steps shown in FIG. 9 result from processor (e.g., CPU 66) execution of routine(s) 64-$n$ (see FIG. 5) and produce three-dimensional coordinates for a relatively few landmark points. In FIG. 9, assume that the user object being imaged is a hand, although of course in practice other or additional objects could be imaged. At method step 400, frames of images acquired by spaced-apart cameras 55L and 55R are read substantially simultaneously, preferably within about ±1 ms. At method step 400, a substantially large number (N) of data points is dealt with, comprising at most data from all pixels in the sensor array for camera 55L, and all pixels in the sensor array for camera 55R. N is potentially very large as pixel resolution may range from perhaps 640×480 for a VGA camera array to 1280×720 for a HD 720p array. Output data from high resolution sensor arrays can be compressed to reduce data bandwidth requirements, but too much compression can result in undesired image artifacts that can interfere with the detection algorithms. Trial and error experimentation with compression levels is recommended.

Method step 410 seeks to extract features of the acquired imagery that are relevant to identifying landmarks associated with a particular natural interface detection scenario. Without loss of generality, assume for ease of description that a goal is to find and accurate track the $(x_w, y_w, z_w)$ location in three-dimensional space of a pointed index fingertip imaged by glasses device 30 (or clip-on device 30'). A feature that helps finding a pointed index finger is the contour of the shape of the index finger connected to the rest of the user hand. In practice, at method step 410, edges of objects, e.g., hands, fingers, fingertips, in the frames acquired in step 400 are detected using an edge detection algorithm that reduces the acquired image to a description of a series of continuous edges. The edge identification procedure can be performed on frame data from camera 55L, and optionally be repeated for the simultaneously acquired frame from camera 55R. The edge detection algorithm typically applies gradient filters and computes edges by computing gradient magnitudes and directions. Method step 410 advantageously can reduce the number of candidate pixels where a hand object can be found by 90% or more. Coming out of step 410, the potential landmark points reside in the typically 10% or less of the number N data points that remain.

At method step 420, intelligent user hand model reasoning is applied. For example an index finger has to be part of a user hand, and if a hand object is not found and identified, it is most unlikely an index finger will be found. In preferred embodiments of the present invention, the existence of a hand object with an extended index finger in a particular region of the image comprising edges (and perhaps color information) is expressed with a probability. If a hand object with an extended finger is found with a relative high probability (e.g. >80% to 90%), the algorithm continues to method step 430. Otherwise, if a hand object is not recognized with high probability, the routine branches back to step 400, to fetch the next frame of image data. Preferably step 420 does not include a high threshold probability of finding a hand object, to preclude a high incidence of false negatives. False negatives imply there is a hand object in the image, but the algorithm does not detect it. It is preferable to reject subsequently in the processing flow an incorrect decision made at step 420. So doing does not increase false alarms or false positive, meaning a hand object is not in the image but the algorithm detects something that it incorrectly assumes to be a hand. In practice, method step 420 typically eliminates about 99% of the pixels in the original frame acquired at step 400. This is of course a substantial reduction of data, which promotes rapid data processing of landmark data, using inexpensive hardware, while enjoying substantially reduced latency times. Thus at step 420 a decision can be made with reasonably high probability as to whether the imaged object is or is not a hand. In step 420, the candidate landmark points reside is a set of data that is now culled down to about 1% or less of the number N referred to method step 400.

Method step 430 undertakes detection of a fingertip on the hand object. Preferably a reasoned basis for detection assumes certain hand and fingertip characteristics, for the current example being described. For example, an extended index finger typically appears as a cylinder shape extending outwardly from a roughly rectangle shape of folded fingers, with the distal end of the cylinder shape being a fingertip location. Method step 430 can reduce the list of candidate pixels potentially representing the fingertip by about at least 99.9% and more typically by at least 99.99%. Thus in step 430, the candidate landmark points reside is a set of data that is now culled down to about 0.1% or less of the number N referred to method step 400, and more preferably to about 0.01% or less. By way of example, if step 400 pertained to a frame of VGA resolution data, following step 430, perhaps thirty pixels will survive as candidates for the fingertip location. Understandably it is important to select a point location in the potential fingertip that is uniquely identifiable in image frame data from both cameras. An exemplary point would be the maxima of the crescent shape that defines a fingertip. Note that the found shape of a fingertip ensures there will be an uppermost point, even if the finger is pointed at an angle with respect to the cameras. Thus, data passing method step 430 will contain potential candidates for objects strongly believed to include a fingertip on the detected hand object.

Understandably substantial data for processing has already been eliminated, and method step 440 undertakes three-dimensional reconstruction for the relatively few candidates that probably represent a fingertip of the user hand object. Use of such methodology contributes to real-time throughput for glasses system 40. Such three-dimensional reconstruction will identify the $(x_w, y_w, z_w)$ real-world coordinates for the set of candidates that have survived method step 430. Intrinsic and extrinsic camera parameters including calibration parameters can be used, and can justify application of epipolar line geometric analysis to disambiguate candidates, as described herein with respect to FIGS. 6B-6G.

At method step 450 additional data is discarded for objects believed to be false fingertips, or objects that are out of distance boundary range of the overlapping FOVs of cameras 55L, 55R to represent a fingertip. For example if the overlapping FOVs of the camera defines an operational imaging range of say 100 cm, then candidate landmark points that appear to be farther than 100 cm, e.g., a typical user's arm length, from the cameras are either too far away to be a valid fingertip, or the method has produced invalid data.

Method step 460 performs reasoned analysis on the dynamic behavior of surviving fingertip candidates. At this juncture, the device has information about the location of the best estimate of the fingertip from the previous frame of data from cameras 55L, 55R. The device also has data regarding the trajectory and perhaps an assumption as to speed of the probable fingertip. This information from the previous data frame, obtained earlier at step 400, can provide good hints about choosing the location of the most likely fingertip in the current frame of data. Using the original size of the frame as a reference, the results of method step 460 can generally eliminate at least 99.99% of the data, and more typically at least 99.999% of the data. Thus with respect to the number N referred to at step 400, step 460 can reduce the data to about 0.001% of N or better, and preferably to about 0.0001% of N or better. The remaining relatively few fingertip locations are passed with high confidence to method step 470 for output used to produce natural interface three-dimensional input events, for use as needed. It will be appreciated that if image information acquired by one camera is non-conclusive, the image from the other camera can be used to increase confidence in identifying a suspected gesture. At method step 470, each of the potential landmark locations can be characterized with confidence probabilities as being a type of user object. For example, perhaps landmark point C (see FIG. 3A) has a 95% probability of being a user right index finger, and a 5% probability of being another finger. Software associated with method step 470 ultimately makes the final decision. Output from method step 470 could be used as input to interact with a true three-dimensional application that renders a true three-dimensional output. Such methodology helps device system 40 obtain good real-time throughput.

Figures 10A, 10B:
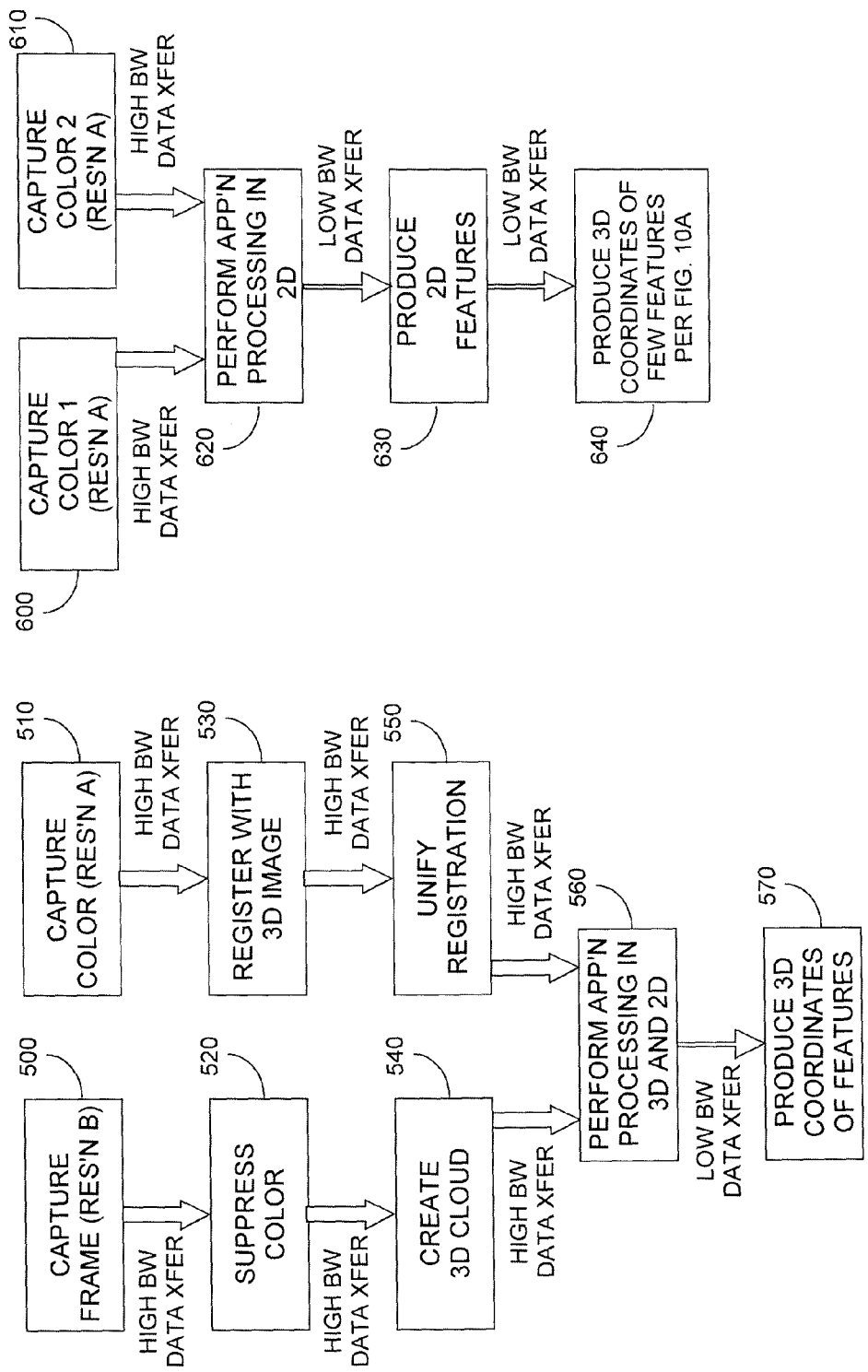
FIG. 10A depicts the many process steps and associated high bandwidth data rate requirements associated with three dimensional sensing methods according to the prior art.
FIG. 10B depicts the relatively fewer process steps and associated low bandwidth data rates to acquire three-dimensional coordinates for a relatively few landmark points, according to embodiments of the present invention.

FIG. 10A and FIG. 10B are useful to understanding a preferred method of processing used by glasses system 40. FIG. 10A depicts major processing steps and many high data bandwidth requirements for a traditional prior art gesture recognizing system using full three-dimensional sensors. FIG. 10B depicts the major processing steps and relatively few high data bandwidth requirements for gesture sensing preferably used by glasses system 40, according to embodiments of the present invention.

In FIG. 10A, the prior art method at steps 500 and 510 captures frame data and color data, but at two different resolutions, high resolution A, perhaps RGB, and lower resolution B, perhaps z-pixel. A high bandwidth data transfer is required to couple the data from steps 500, 510 to respective steps 520, 530. At step 520 color information is suppressed, and at step 530, registration with a three-dimensional image occurs. (As will be described shortly with respect to FIG. 10B, neither of these steps is required in the present invention.) In FIG. 10A again high bandwidth data transfer is required to couple information from steps 520, 530 to respective steps 540, 550. At step 540 a full three-dimensional cloud is created and at step 550 resolutions between high resolution A and lower resolution B are unified. However as described with respect to FIG. 10B, neither of these steps is required in the present invention. Yet again high bandwidth data transfers are required to couple information from steps 540, 550 to step 560, whereas application processing occurs in both three-dimensions and two-dimensions. The output from step 560 is then coupled via a low bandwidth data transfer to step 570, where three-dimensional coordinates are generated for the features captured by the prior art system.

Compare now FIG. 10B. At method steps 600, 610 image capture occurs at a common resolution for two cameras, e.g., 55L, 55R. A high bandwidth data transfer then couples this information to step 620, which performs application processing in two-dimensions. The step 620 is somewhat analogous to step 560 in prior art FIG. 10A, but note how many intermediate processing steps and attendant high bandwidth data transfer paths have been eliminated in FIG. 10B. In FIG. 10B a low bandwidth data transfer couples information from step 620 to step 630, where two-dimension features are produced. A low bandwidth data transfer then couples information from step 630 to step 640 where three-dimensional coordinates are produced, but only for a few landmark features in the images acquired by the cameras. Method steps 600-640 in FIG. 10B are further described with respect to FIG. 10A.

Different modes of gestures are recognizable by system 40, such as gestures that include a time pause during the making of the gesture, and forward and backward poking type user-object movements. Gesture recognition can unambiguously discern left-to-right motions from right-to-left motions of the user-object. Imperfections in the user's making of gestures, e.g., failure to hold the hand sufficiently steady during a pause, drawing a crooked virtual straight line, or drawing a wobbly imperfect circle during gestures are compensated for by software associated with the device. Such compensation can be achieved because methods used with embodiments of the present invention quickly produce accurate three-dimensional information about user object 110, and without requiring the user to wear any glove or marker.

Figure 11A:
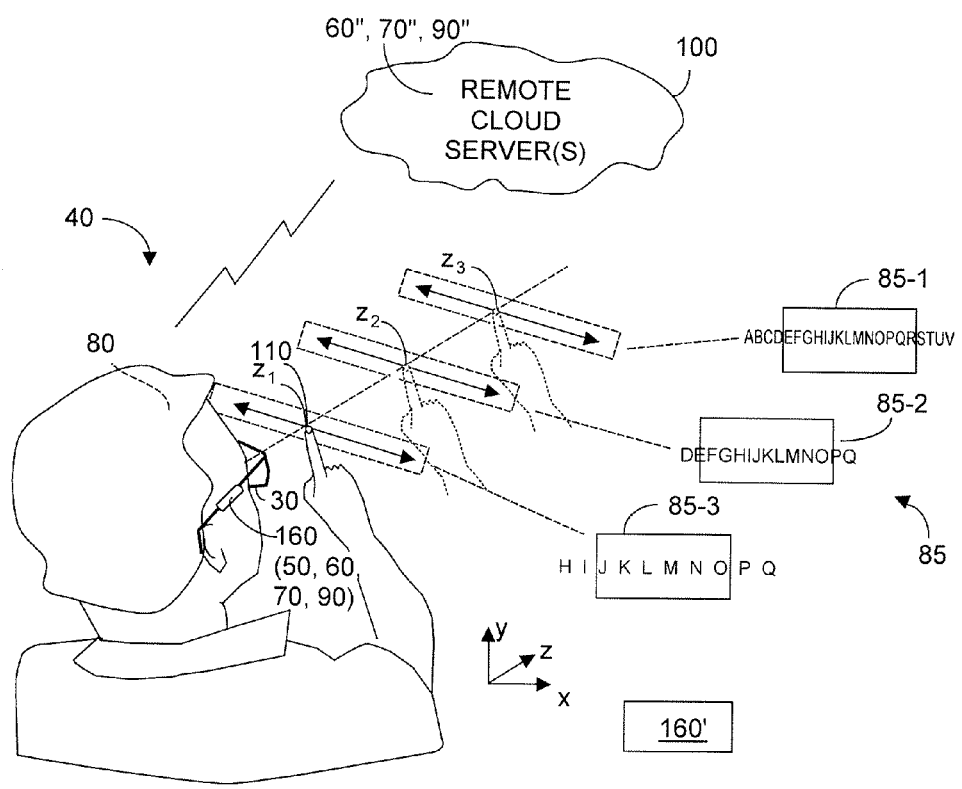
FIG. 11A depicts exemplary imagery granularity scaling made with depth gestures, according to embodiments of the present invention.

FIG. 11A depicts a user wearing glasses 30 and making hand gestures in the z-depth domain that are detected by glasses system 40 to intentionally alter granularity of selection options that the user can see as imagery 85 on display 80. Assume that the alphabet letters shown represent user options from what may be a lengthy list of options. If glasses system 40 is displaying radio stations, then the alphabet letters (ABCDEFGHIJK etc.) could represent a plurality of radio station choices. If what is displayed is perhaps video titles, the alphabet letters could represent video titles. Embodiments of the present invention allow the user to quickly "scrub" or move rapidly through the initial listing 85-1, and then with a hand gesture mover more and more slowly, e.g., listing 85-2, to arrive and a listing with much finer granularity of choices centered about what the user desires, e.g., listing 85-3. This is somewhat analogous to tuning an old fashioned analog short-wave receiver: one rotary knob made coarse tuning frequency changes, and a second rotary knob made frequency fine tuning.

In FIG. 11A, eye glasses system 40 can detect whether the user gesture is left-to-right or right-to-left, and where in (x,y, z) space, more specifically, where along the z-axis such movements are being made. For example initially the user's forefinger 110 is at distance $z_3$ from glasses 30, perhaps 1 m or an arm's length. At that distance software executed by glasses system 40 creates and causes to be presented on display 80 a very coarse, very dense set of listings, suggested by 85-1. Assume the user's hand and forefinger is moved left-to-right to center the "HIJ" portion of the listing on virtual display 80. If the user's hand and forefinger are moved closer to the glasses, to intermediate distance $z_2$, perhaps 50 cm although the precise distance is not critical, then a less coarse presentation of choices is viewable as 85-2. Assume the user wants to center the choices around "LM". This can be done by moving the hand and forefinger right-to-left. If the user also brings the hand and forefinger closer to glasses 30, e.g., at a relatively smaller z-distance $z_1$, perhaps 20 cm, the result will be the finer granularity display shown as 85-3. Obviously more than three levels of granularity can be shown as the user's hand moves from far away to closer to glasses 30. Once the user sees as imagery 85 on virtual display 80 the desired choice, perhaps among a relatively few alternative choices, the user can make a special gesture, perhaps a hand "cocking" gesture to denote "select this object". Depending upon the software application being executed, the user might then see a "yes" and a "no" button or hear a reinforcing auditory signal, to confirm that glasses system 40 has discerned the correct user intent in making the selection and will respond accordingly.

FIG. 11B is somewhat similar to what was depicted in FIG. 11A except that after the user "scrubs" granularity of menu options or the like with z-direction hand movements, the user selects whether menu choices should scroll left or right using rotational hand gestures. Initially the user's hand 110 is at distance $z_3$ and the imagery viewed on display 80 appears as 85-1. If the user wishes to scroll the horizontal menu items, here ABCDEFGH etc., such scrolling is made with clockwise or counter clockwise hand motions, as shown. For example after viewing imagery 85-1 the user may wish to scroll the displayed items in the right hand direction such that JKL become centered on display 80. In the embodiment shown a counter-clockwise hand gesture is made in the x-y plane (shown in FIG. 11C), and in addition the user's hand is moved closer to glasses 30, to position $z_2$. The result as shown as imagery 85-2 is a better resolution menu display, now centered on items JKL. Perhaps the user has scrolled too far in the right hand direction and wishes now to have even better resolution display with menu items LM centered on display 80. This is accomplished by rotating the user's hand clockwise in the x-y plane (as shown in FIG. 11D) and also moving the user's hand closer to glasses 30, to z-position $z_1$. The desired result is shown as imagery 85-3. At this juncture the user may "select" one of the items, which now appear sufficiently spread out to more readily point with the forefinger to make a selection. The software application being executed by signal processor system 60 could of course recognize scroll gestures made in the z-y plane (rather than the x-y plane), as indicated by FIG. 11E and FIG. 11F.

Figure 12A:
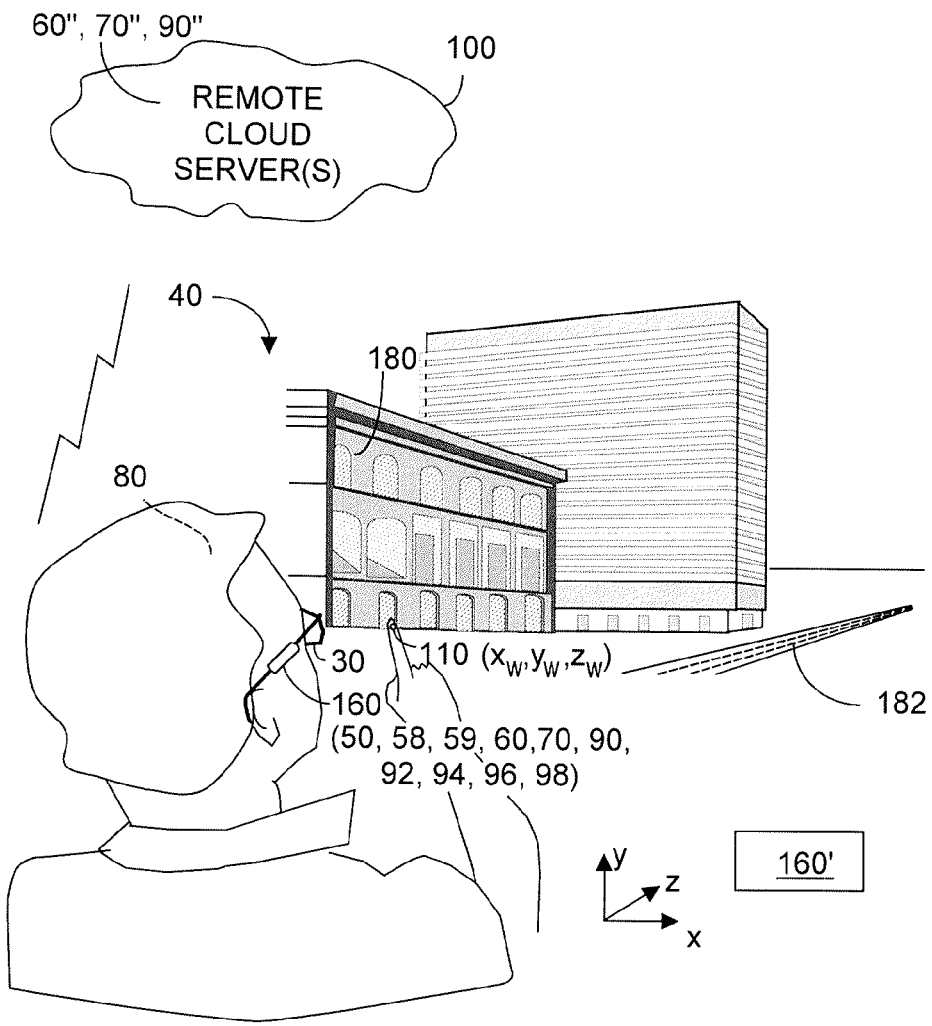
FIG. 12A depicts use of the present invention and gestures to elicit information while viewing a display combining real world images and compass-GPS obtained data labels, according to embodiments of the present invention.
Figure 12B:
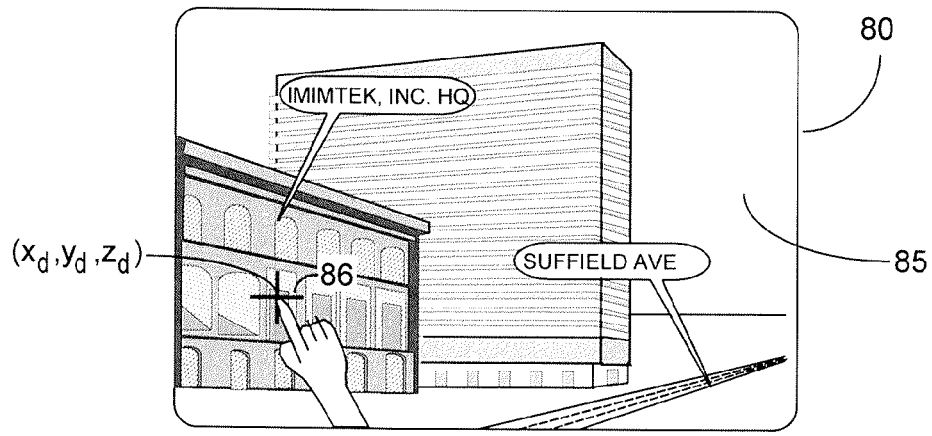
FIG. 12B depicts imagery viewed on a glasses-mounted display by a user of the embodiment of FIG. 12A, according to embodiments of the present invention.

FIG. 12A depicts an embodiment in which glasses system 40 is augmented with a GPS-compass module 58 that in addition to knowing the user's (x,y,z) coordinates on earth, also knows the direction the user's glasses are facing. In this embodiment cameras 55R, 55L acquire images of whatever the user is looking at, here two large buildings and a road, and the user's hand, here pointing at the building on the left. Using data preferably available from the Internet via cloud server network 100, glasses system 40 can rapidly learn the identity of the pointed to building. The user can continue interacting with images of real objects, similarly to interacting with icons in a typical graphical user interface. For instance, glasses system 40 can wirelessly access, e.g., via server(s) 100, an internet service, perhaps www.zillow.com, whereupon the estimated current market value of the pointed-to property object can be determined and displayed as part of imagery 85. FIG. 12B depicts imagery 85 viewed by the glasses user on display 80 and depicts a crosshair cursor 86 that follows the user's fingertip 110 on what may be a phantom representation of the user's actual hand.

Recalling the description of FIG. 4B and FIG. 4C, in the embodiment shown in FIG. 12, establishing a correspondence between imagery 85 viewed on display 80, and fingertip 110, involves establishing an acquired geographical map for the real world object(s) viewed on display 80. As noted, cameras 55R and 55L are securely attached to glasses system 30 as worn by the user. Thus the user's head, glasses 30, cameras 55L, 55R, and display 80 form a connected assembly. Preferably, to reduce disparity, imagery 85 will have been captured by the camera closest to display 80. As such the user can look in different directions (left/right, or up/down) and see the scene substantially in the user's line of sight in imagery 85 from one of the cameras. This is accomplished by providing a common global coordinate system $(x_w, y_w, z_w)$ that establishes correspondences between the user's line of sight, pixel coordinates of display 80, and three-dimensional locations of the user finger 110. FIG. 4B and FIG. 4C depicted the correspondences between the three-dimensional $(x_w, y_w, z_w)$ coordinates of user finger 110, and pixel coordinate locations on display 80 in the user's line of sight, with respect to $(x_w, y_w, z_w)$. In the embodiment of FIG. 12A and FIG. 12B, a transformation from this $(x_w, y_w, z_w)$ coordinate system to a fixed world coordinate system is needed, where the geographic map of terrain, streets and point of interests as seen by the user are defined. Assuming a locally flat world, this requirement means that the present user latitude/longitude location, and azimuth/elevation of a user head centered reference system need to be known. User location can be obtained by providing glasses system 40 with a GPS sensor 58, and azimuth/elevation can be obtained by providing glasses system 40 with an accelerometer 94 to compute elevation, and a digital compass 96 to compute azimuth. These ancillary sensors can be mounted within housing 160, as shown in FIG. 12B.

However in practice, GPS and compass sensors can be unacceptably inaccurate in urban canyons, strong electromagnetic fields, and other environments. Such sensor inaccuracy can compromise system 40 performance, perhaps resulting in a mismatch between a sighted building pointed to by the user's finger and the estimated building location. However the user location can be refined if at least three points of interest are in sight, e.g., shops, restaurants, monuments, and the user forefinger can point to each one of these three points of interest. It is assumed in this example that GPS location data for these three points of interest in the geographical map is known. For example, the user may point to one location and say "Starbucks"®, point to another location and say "Shogun Sushi Restaurant" ®, and point to a third location and say "Macy's" ®. (In this example it is assumed that optional microphone 59 is present and is coupled to suitable voice recognition software in memory 62.) The detected real-world position of the user's forefinger when pointing to each of the three locations enables computing angles of pairs of lines of sight to these known points of interest. Consequently system 40 can triangulate the location and orientation of the user and at this juncture, mapping between a visible landmark and its GPS location can be accurately established. Any slight rotation of the user's head during this calibration-calculation process could be accurately measured and accounted for by a three-axis gyroscope 98, disposed in housing 160. Gyroscope 98 could also be useful to track relative orientation of the user's head when data from digital compass 96 is unreliable.

With reference to the embodiment of FIG. 12A and FIG. 12B, given the direction glasses 30 are facing and the user's real-world location, pointed-to building 180 has been identified as "IMIMTEC, INC. HQ" as part of the imagery 85 viewable on display 80. The software application being executed by glasses system 40 may, if the user continues to point at the same building for a time, perhaps one or two seconds, display user-viewable information as to the nature of the business of Imimtec, Inc. While pointing at the building, the user may make a zoom gesture with a finger (or with fingers, and/or thumb), perhaps moving the finger toward the building in to enlarge imagery 85 as seen in display 80 for that location. If the user were to point to the adjacent street 182 in the viewed imagery, glasses system 40 software could provide and display a label identifying the street name, here "SUFFIELD AVE." on imagery 85 as viewed on display 80. If the user continued to point at the street for a time, perhaps a second or two, a label showing the approximate street number could appear for user viewing on display 85. These are but several examples of applications implementable with embodiments of the present invention.

FIG. 12 is but one example of an application for which glasses system 40 can be used. For example, if sufficiently close to an unknown species of bird, the user could look at and point to the bird. An appropriate application being executed by glasses system 40 could via the internet and cloud network server 100 identify the bird and display the species as part of the imagery 85 viewed by the user on display 80. Such nature identification is but one of many educational uses to which embodiments of the present invention may be applied.

To recapitulate, the various embodiments of the present invention use lightweight inexpensive components with a form factor having a thickness less than about 4 mm, and consuming less than a few hundred mW of operating power, and more preferably less than about 25 mW of operating power. An advantage of an inexpensive lightweight unit it that it can be fabricated as a device that clips-on to a user's existing eye glasses.

Modifications and variations may be made to the disclosed embodiments without departing from the subject and spirit of the invention as defined by the following claims.

What is claimed is:

1. A method to enable an unadorned user-object to communicate using gestures made in (x,y,z) space with an eye glasses wearable electronic device coupleable to a display having a display screen whereon user viewable imagery is displayable, the method including the following steps:
   (a) providing said eye glasses wearable electronic device with an optical acquisition system operable to capture image data of said unadorned user-object within a three-dimensional hover zone;
   (b) defining within said three-dimensional hover zone an interaction subzone including at least one $z_0$ plane disposed intermediate said eye glasses wearable electronic device and a plane at a maximum z-distance beyond which unadorned user-object gestures need not be recognized by said electronic device;
   (c) processing image data captured at step (a) representing an interaction of said unadorned user-object with at least a portion of said interaction subzone, defined in step (b), to produce three-dimensional positional information of a detected said interaction;
   (d) using said three-dimensional positional information produced at step (c) to determine at least one of (i) when in time, and (ii) where in (x,y,z) space said unadorned user-object interaction occurred;
   (e) following determination at step (d), identifying a gesture being made by said unadorned user-object; and
   (f) in response to identification of a gesture at step (e), generating and coupling at least one command to said display, said command having at least one characteristic selected from a group consisting of (I) said command causes altering at least one aspect of said viewable imagery, and (II) said command causes alteration of a state of said display regardless of whether an altered said state is user viewable.

2. The method of claim 1, wherein said eye glasses wearable electronic device is provided with at least one of (i) a video generation system generating said viewable imagery, and (ii) said display screen, mechanically coupled to said eye glasses wearable electronic device, whereon said viewable imagery is displayed for viewing by said user.

3. The method of claim 1, wherein said viewable imagery is displayed on a device external to said eye glasses wearable electronic device.

4. The method of claim 1, wherein step (a) includes providing an at least two two-dimensional camera system.

5. The method of claim 1, wherein at step (c) said unadorned user-object interaction occurs within at least a portion of said $z_0$ plane.

6. The method of claim 1, wherein in response to detection of unadorned user-object interaction, step (b) includes carrying out at least one step selected from a group consisting of:
   (i) customizing location of said interaction subzone and said $z_0$ plane within;
   (ii) accommodating comfort of said unadorned user-object during interaction by dynamically altering location of said interaction subzone and said $z_0$ plane within;
   (iii) altering size of said interaction subzone and said $z_0$ plane within; and
   (iv) dynamically altering appearance of at least a region of imagery rendered on said display screen.

7. The method of claim 1, wherein step (f) further includes at least one of (i) rendering a cursor object targeting a GUI element on said display screen, (ii) rendering on said display screen a GUI commensurate with said gesture identified at step (e), (iii) anticipatorily distinguishing a portion of said display screen believed to be affected by an immediately following gesture, (iv) dynamically altering size of an object rendered on said display screen, (v) dynamically altering a viewable characteristic of an object rendered on said display screen, and (vi) altering an operating mode of said eye glasses wearable electronic device responsive to a location of said unadorned user-object detected at step (c).

8. The method of claim 1, wherein step (f) causes said eye glasses wearable electronic device to create at least one type of visual feedback, presented on said display screen, selected from a group consisting of (i) displaying a ribbon menu responsive to an identified gesture that is directed at a specific region of said display screen, (ii) displaying a virtual cursor keypad responsive to an identified gesture directed at a specific region of said display screen, and (iii) displaying a dynamically size changing icon responsive to an identified gesture directed at a specific region of said display screen.

9. The method of claim 1, wherein a recognized gesture includes at least one of (i) virtually touching an object rendered on said display screen with said unadorned user-object, (ii) virtually touching an object rendered on said display screen with said unadorned user-object and altering at least one of object size and object orientation, (iii) a gesture interacting with a three-dimensional object, having at least three virtual points thereon, rendered on said display screen, each of said three virtual points mappable to one of three points on said unadorned user-object such that said unadorned user-object can virtually grasp and manipulate said object, and can then virtually decouple from and release said object, (iv) generating and coupling a command commensurate to said recognized gesture to said display.

10. The method of claim 1, wherein:
   step (a) provides said optical acquisition system with at least two spaced-apart two-dimensional cameras whose respective fields of view (FOVs) intersect to define said hover zone; said cameras acquiring optical image data from at least N two-dimensional data point of a gesture made by said unadorned user-object without said unadorned user-object having to touch said display screen for detectable interaction to occur;
   step (c) processes two-dimensional image data acquired by said two spaced-apart two-dimensional cameras to carry out at least one processing step selected from a group consisting of:
   (I) representing an imaged portion of said unadorned user-object user using a set of landmark points sufficient to recognize a gesture made by said unadorned user-object, and discarding at least about 90% of said number N data points, and representing an imaged portion of said unadorned user-object using a set of landmark points sufficient to recognize a gesture made by said unadorned user-object;
   (II) in addition to (I) above, further extracting from said number N of data points a lesser number of three-dimensional landmarks, wherein magnitude N of said three-dimensional landmarks has a characteristic selected from a group consisting of (i) said magnitude N≤100, (ii) said magnitude N≤50, and (iii) said magnitude N≤12;
   (III) in addition to (II) above, further processing said two-dimensional image data so as to extract from said number N of data points a lesser number of three-dimensional landmarks such that processing reduces acquired image information to at least one magnitude selected from a group consisting of (i-1) ≤1% N, (ii-2) processing reduces acquired information to ≤0.1% N, and (iii-3) processing reduces acquired information to ≤0.01% N; and
   (IV) (i-a) said processing includes edge detection, (ii-b) said processing includes object modeling, (iii-c) said processing includes image rectification, (iv-d) said processing includes epipolar geometric analysis, and (v-e) said processing includes machine learning;
   wherein said landmark has at least one characteristic selected from a group consisting of (i) said landmark is approximate centroid of said user's hand, (ii), said landmark is approximate centroid of said user's finger, and (iii) said landmark is approximate location of said user's fingertip.

11. An eye glasses wearable system enabling an unadorned user-object to communicate using gestures made in (x,y,z) space with an eye glasses wearable electronic device coupleable to a display having a display screen whereon user viewable imagery is displayable, the system including:
   an eye glasses system including an optical acquisition system operable to capture image data of said unadorned user-object within a three-dimensional hover zone, said optical acquisition system including at least two two-dimensional cameras;
   means for defining within said three-dimensional hover zone an interaction subzone including at least one $z_0$ plane disposed intermediate a plane of said display screen and a plane at a maximum z-distance beyond which unadorned user-object gestures need not be recognized by said electronic device;
   means for processing captured image data representing an interaction of said unadorned user-object with at least a portion of said interaction subzone to produce three-dimensional positional information of a detected said interaction;
   means for using processed captured said three-dimensional positional data and for determining at least one of (i) when in time, and (ii) where in (x,y,z) space said unadorned user-object first interaction occurred;
   means for identifying a gesture being made by said unadorned user-object; and
   means for generating and coupling at least one command to said display, said command having at least one characteristic selected from a group consisting of (I) said command causes altering at least one aspect of said viewable imagery, and (II) said command causes alteration of a state of said display regardless of whether an altered said state is user viewable.

12. The eye glasses wearable system of claim 11, further including at least one of (i) a video generation system generating said viewable imagery, (ii) said display and said display screen, mechanically coupled to said eye glasses wearable electronic device, whereon said viewable imagery is displayed for viewing by said user, and (iii) means for attaching said eye glasses wearable system retrofittably to an existing pair of user wearable eye glasses.

13. The eye glasses wearable system of claim 11, wherein said unadorned user-object includes at least one of (i) at least a portion of a user's arm, (ii) at least a portion of a user's hand, (iii) at least a portion of a user finger, and (iv) at least a portion of a user's thumb.

14. The eye glasses wearable system of claim 11, wherein said unadorned user-object interaction occurs within at least a portion of said $z_0$ plane.

15. The eye glasses wearable system of claim 11, wherein in response to detection of user-object interaction, said means for defining carries out at least one step selected from a group consisting of:
   (i) customizing location of said interaction subzone and said $z_0$ plane within;
   (ii) accommodating comfort of said unadorned user-object during interaction by dynamically altering location of said interaction subzone and said $z_0$ plane within;
   (iii) altering size of said interaction subzone and said $z_0$ plane within; and
   (iv) dynamically altering appearance of at least a region of imagery rendered on said display screen.

16. The eye glasses wearable system of claim 11, wherein said means for generating and coupling carries out at least one of (i) rendering a cursor object targeting a GUI element on said display screen, (ii) rendering on said display screen a GUI commensurate with an identified said gesture, (iii) anticipatorily distinguishing a portion of said display screen believed to be affected by an immediately following gesture, (iv) dynamically altering size of an object rendered on said display screen, (v) dynamically altering a viewable characteristic of an object rendered on said display screen, and (vi) altering an operating mode of said device responsive to a detected location of said unadorned user-object.

17. The eye glasses wearable system of claim 11, wherein said eye glasses wearable system recognizes at least one gesture selected from a group consisting of (i) virtually touching an object rendered on said display screen with said unadorned user-object, (ii) virtually touching an object rendered on said display screen with said unadorned user-object and altering at least one of object size and object orientation, (iii) a gesture interacting with a three-dimensional object, having at least three virtual points thereon, rendered on said display screen, each of said three virtual points mappable to one of three points on said unadorned user-object such that said unadorned user-object can virtually grasp and manipulate said object, and can then virtually decouple from and release said object.

18. The eye glasses wearable system of claim 11, wherein said eye glasses wearable electronic device further includes at least one of (i) a video generation system generating said viewable imagery, and (ii) said display screen, mechanically coupled to said eye glasses wearable electronic device, whereon said viewable imagery is displayed for viewing by said user.

19. The eye glasses wearable system of claim 11, wherein said viewable imagery is displayed on a device external to said eye glasses wearable electronic device.

20. The eye glasses wearable system of claim 11, wherein:
- said optical acquisition system includes at least two spaced-apart two-dimensional cameras whose respective fields of view (FOVs) intersect to define said hover zone; said cameras acquiring optical image data from at least N two-dimensional data point of a gesture made by said unadorned user-object without said unadorned user-object having to touch said display screen to interact with said $z_0$ plane;
- said means for processing image data processes two-dimensional image data acquired by said two spaced-apart two-dimensional cameras so as to carry out at least one processing step selected from a group consisting of:
- (I) representing an imaged portion of said unadorned user-object user using a set of landmark points sufficient to recognize a gesture made by said unadorned user-object, and discarding at least about 90% of said number N data points, and representing an imaged portion of said unadorned user-object using a set of landmark points sufficient to recognize a gesture made by said unadorned user-object;
- (II) in addition to (I) above, further extracting from said number N of data points a lesser number of three-dimensional landmarks, wherein magnitude N of said three-dimensional landmarks has a characteristic selected from a group consisting of (i) said magnitude $N \leq 100$, (ii) said magnitude $N \leq 50$, and (iii) said magnitude $N \leq 12$;
- (III) in addition to (II) above, further processing said two-dimensional image data so as to extract from said number N of data points a lesser number of three-dimensional landmarks such that processing reduces acquired image information to at least one magnitude selected from a group consisting of (i-1) $\leq 1\%$ N, (ii-2) processing reduces acquired information to $\leq 0.1\%$ N, and (iii-3) processing reduces acquired information to $\leq 0.01\%$ N; and
- (IV) (i-a) said processing includes edge detection, (ii-b) said processing includes object modeling, (iii-c) said processing includes image rectification, (iv-d) said processing includes epipolar geometric analysis, and (v-e) said processing includes machine learning;
- wherein said landmark has at least one characteristic selected from a group consisting of (i) said landmark is approximate centroid of said user's head, (ii) said landmark is approximate centroid of said user's hand, (iii), said landmark is approximate centroid of said user's finger, and (iv) said landmark is approximate location of said user's fingertip.

* * * * *